(12) United States Patent
Katsipoulakis et al.

(10) Patent No.: US 12,007,990 B1
(45) Date of Patent: Jun. 11, 2024

(54) DEFERRED CONSTRAINTS SUPPORT IN DISTRIBUTED DATABASE SYSTEMS

(71) Applicant: Snowflake Inc., Bozeman, MT (US)

(72) Inventors: Nikolaos Romanos Katsipoulakis, Redwood City, CA (US); Dimitrios Tsirogiannis, Belmont, CA (US); William Waddington, Stateline, NV (US); Zhaohui Zhang, Redwood City, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/447,934

(22) Filed: Aug. 10, 2023

(51) Int. Cl.
*G06F 16/00* (2019.01)
*G06F 16/2453* (2019.01)
*G06F 16/27* (2019.01)

(52) U.S. Cl.
CPC .. *G06F 16/24537* (2019.01); *G06F 16/24542* (2019.01); *G06F 16/27* (2019.01)

(58) Field of Classification Search
CPC ......... G06F 16/24537; G06F 16/24542; G06F 16/27
See application file for complete search history.

(56) References Cited

U.S. PATENT DOCUMENTS

| | | | | |
|---|---|---|---|---|
| 9,607,063 B1* | 3/2017 | Cao | ................... | G06F 16/24534 |
| 10,216,820 B1* | 2/2019 | Holenstein | .......... | G06F 16/2358 |
| 11,210,320 B1* | 12/2021 | Holenstein | .............. | G06F 3/065 |
| 11,461,327 B1* | 10/2022 | Cruanes | ............ | G06F 16/24539 |
| 11,501,202 B1* | 11/2022 | Stefani | ................ | G06F 16/9038 |
| 11,580,134 B1* | 2/2023 | Holenstein | .......... | G06F 11/2097 |
| 2013/0054451 A1* | 2/2013 | Maley | .................... | G06Q 40/02 |
| | | | | 705/40 |
| 2018/0069937 A1* | 3/2018 | Kolleri | .................. | H04L 67/535 |
| 2020/0167332 A1* | 5/2020 | Mathur | ................. | G06F 16/215 |

OTHER PUBLICATIONS

Documentation Postgresql 16, "Create Table", [Online]. Retrieved from the Internet: https: www.postgresql.org docs current sql-createtable.html, (Accessed online Jan. 23, 2024), 18 pages.

(Continued)

*Primary Examiner* — Alexander Khong
(74) *Attorney, Agent, or Firm* — Schwegman Lundberg & Woessner, P.A.

(57) ABSTRACT

The subject technology receives a query, the query including a set of statements, the set of statements including a first statement comprising a first data manipulation language operation. The subject technology determines that the set of statements includes at least one statement defining a first constraint, and a second statement indicating that the first constraint is statement deferrable for performing validation of the first constraint. The subject technology generates a key value constraint check operator as a node in a query plan. The subject technology generates a key value DML operator as a second node in the query plan, the key value DML operator corresponding to the first DML operation. The subject technology performs, using the key value constraint check operator, a validation process of the first constraint based at least in part on a set of violating keys of each DML operation from the set of statements.

27 Claims, 13 Drawing Sheets

(56) References Cited

OTHER PUBLICATIONS

Kung, H.T., "On Optimistic Methods for Concurrency Control", ACM Transactions on Database Systems vol. 6 No. 2, (Jun. 1981), 14 pages.
Microsoft Learn, "Alter Table table constraint Transact SQL", [Online]. Retrieved from the Internet: https: learn.microsoft.com en-us sql t-sql statements alter-table-table-constraint-transact-sql?view=sql-server-2016, (Accessed online Jan. 23, 2024), 8 pages.
Oracle, "Managing Integrity Constraints", [Online]. Retrieved from the Internet: https: docs.oracle.com cdE18283_01 server.112 e17120 general005.htm#i1006825, (Accessed online Jan. 23, 2024), 8 pages.
Oracle Base, "Constraint Checking Updates", [Online]. Retrieved from the Internet: https: oracle-base.com articles 8i constraint-checking-updates#:~:text=A%20deferred%20constraint%20is%20only,INITIALLY%20IMMEDIATE%2C%20INITIALLY%20DEFERRED%20, (Accessed online Jan. 23, 2024), 2 pages.
Oracle Help Center, "Database SQL Reference", [Online]. Retrieved from the Internet: https: docs.oracle.comcd B19306_01 server.102 b14200 clauses002.htm, (Accessed online Jan. 23, 2024), 18 pages.

\* cited by examiner

Query Plan Example

DEFERRED CONSTRAINTS SUPPORT IN DISTRIBUTED DATABASE SYSTEMS

TECHNICAL FIELD

Embodiments of the disclosure relate generally to a network-based database system or a cloud data platform and, more specifically, to processing concurrent transactions to enable OLTP (Online Transactional Processing) in a safe and performant manner (e.g., avoiding deadlock and starvation) within the database system.

BACKGROUND

Cloud-based data warehouses and other database systems or data platforms sometimes provide support for transactional processing, referred to as OLTP, that enable such systems to perform operations that are not available through the built-in, system-defined functions. However, for mitigating security risks, security mechanisms to ensure that user code running on such systems remain isolated are needed.

BRIEF DESCRIPTION OF THE DRAWINGS

The present disclosure will be understood more fully from the detailed description given below and from the accompanying drawings of various embodiments of the disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In database systems, performing transactions on a given database can be supported. To facilitate that a given transaction is committed to a table, existing database systems can employ varying approaches including OLTP techniques. As discussed herein, OLTP (Online Transactional Processing) refers to a category of data processing that involves transaction-oriented tasks. In an example, OLTP involves inserting, updating, and/or deleting varying amounts of data in a given database. OLTP can deal with large numbers of transactions by a large number of users. Increasingly, such transactions occur within and users are working in a distributed and networked environment from varying locations and computing environments. Thus, it is also increasingly important to ensure such transactions execute and complete in a concurrent manner that protects the integrity and consistency of the data in such a distributed environment.

As described herein, the subject technology provides concurrency control and isolation for executing a series of query statements (e.g., SQL statements) within a transaction against a linearizable storage. In particular, the subject technology employs a concurrency control mechanism that is a combination of a multi-version concurrency control for read operations (MVCC) and locking for write operations. Additionally, the subject technology implements a targeted isolation level (e.g., snapshot isolation), where each statement can execute against a different snapshot of a database, and write locks are held until a transaction commit.

The subject technology, in an embodiment, implements a two-level transaction hierarchy, where a top-level transaction corresponds to a SQL transaction, and a nested transaction corresponds to a SQL statement within the parent SQL transaction. A given nested transaction can perform read and write operations, and can perform a rollback and restart execution zero or more times before succeeding. Upon transaction commit, write operations can become visible, and write locks held by each contained statement can be released.

Figure 1:
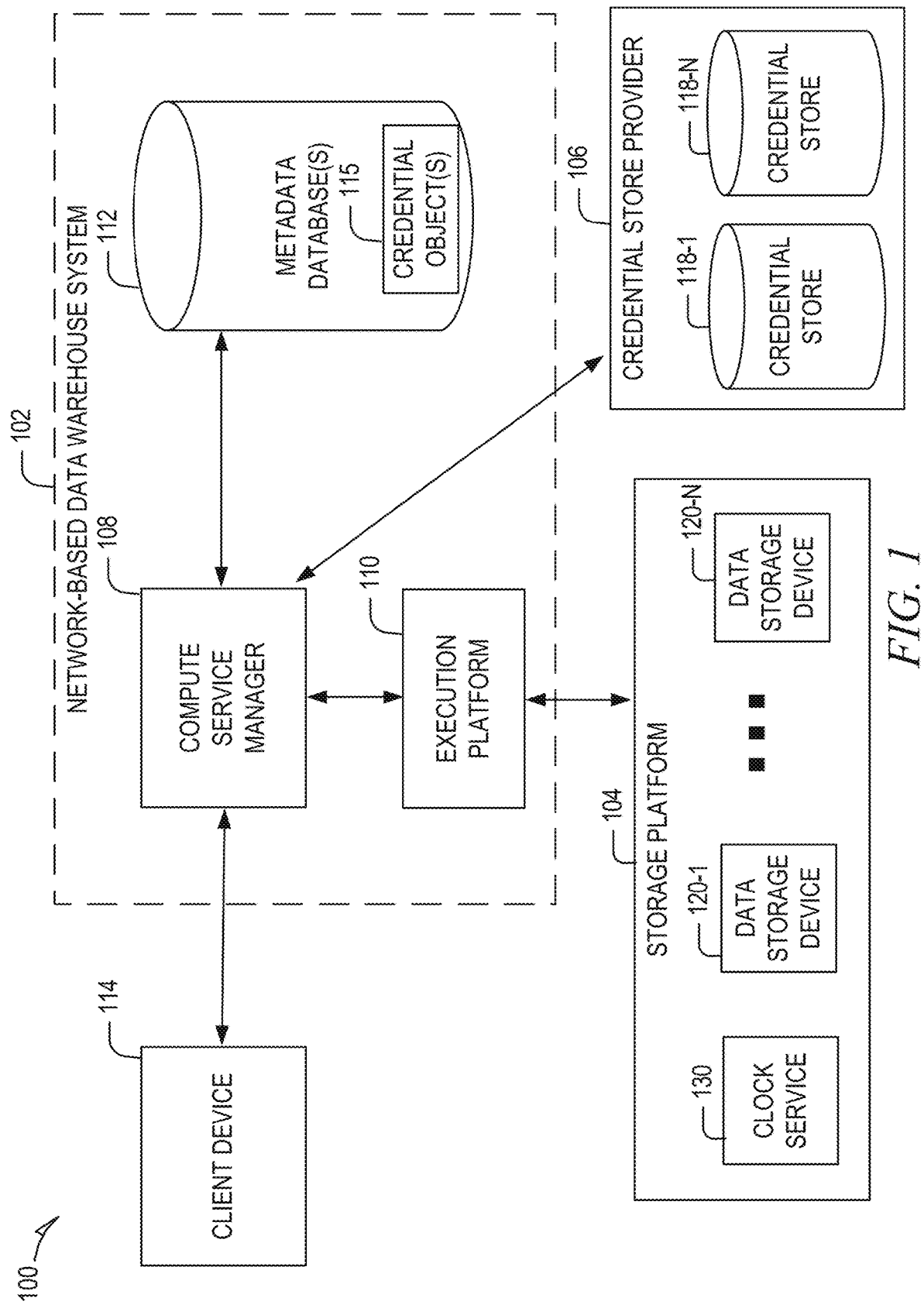
FIG. 1 illustrates an example computing environment that includes a network-based database system in communication with a cloud storage platform, in accordance with some embodiments of the present disclosure.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage), and a cloud credential store provider 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

In an embodiment, a data structure can be utilized for storage of database metadata in the metadata database 112. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML (data manipulation language) statement such as an insert, delete, merge, and/or update command. Each time a DML statement is executed on the table, and a new table version is generated, one or more new micro-partitions may be generated that reflect the DML statement.

In some embodiments, metadata may be generated when changes are made to one or more source table(s) using a data manipulation language (DML), where such changes can be made by way of a DML statement. Examples of modifying data, using a given DML statement, may include updating, changing, merging, inserting, and deleting data into a source table(s), file(s), or micro-partition(s).

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

As further shown, the storage platform 104 includes clock service 130 which can be contacted to fetch a number that will be greater than any number previously returned, such as one that correlates to the current time. Clock service 130 is discussed further herein below with respect to embodiments of the subject system.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternative embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks (or transactions as discussed further herein) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
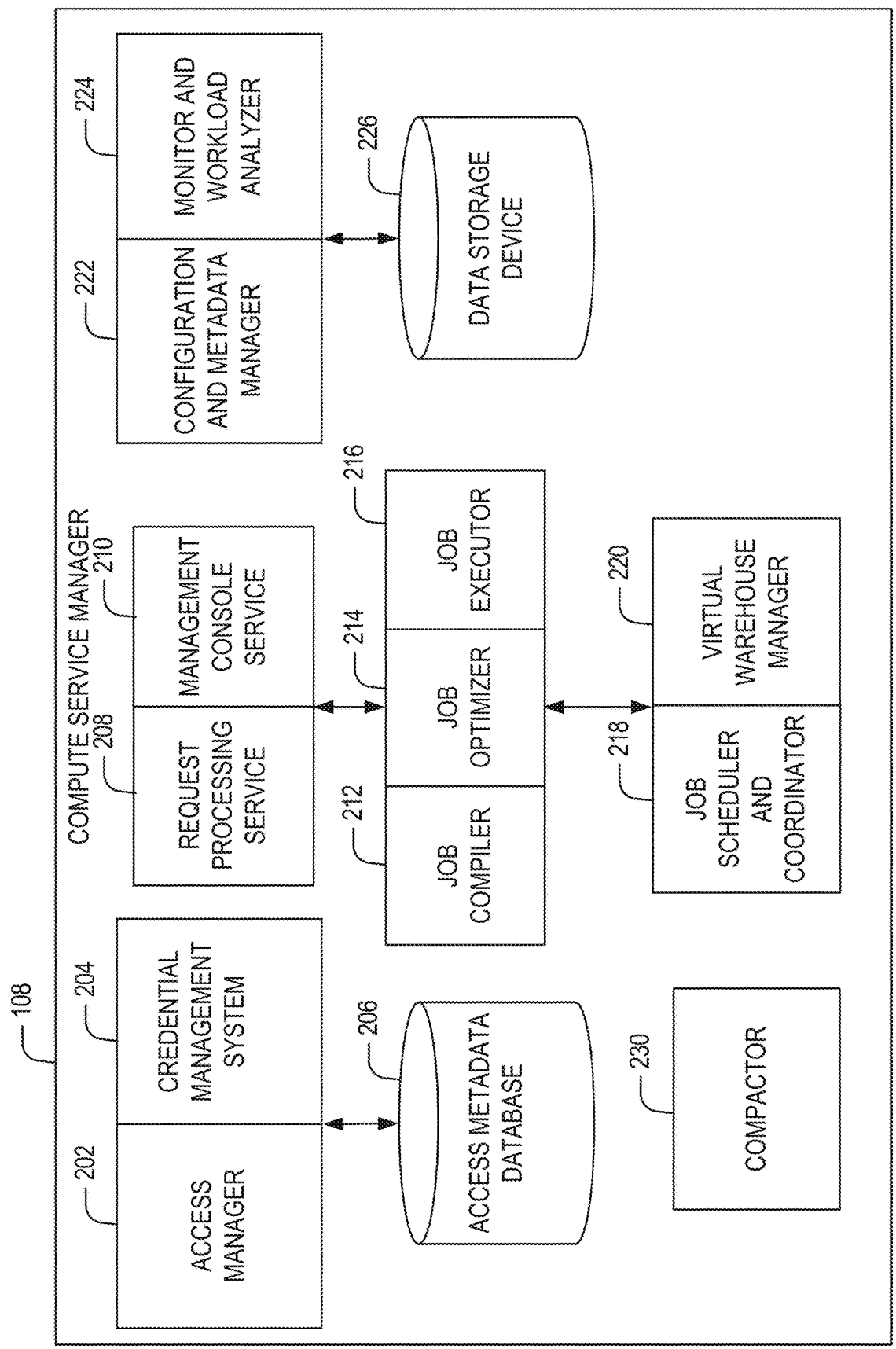
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database (e.g., the storage platform 104) but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

The compute service manager 108 also includes a compactor 230 which is discussed further herein to provide compaction services and performs compaction operations.

Figure 3:
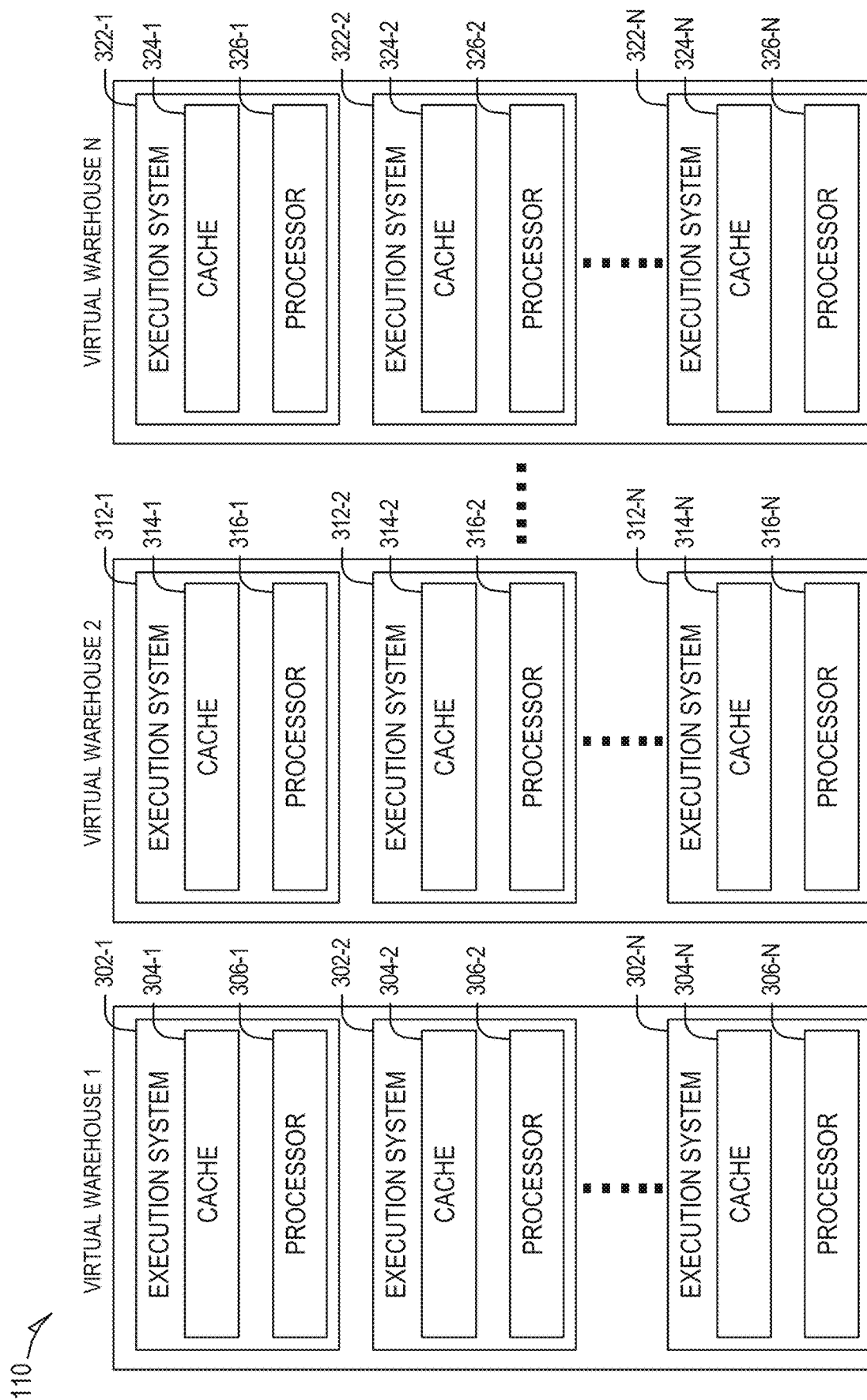
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-*n*. Execution node 302-1 includes a cache 304-1 and a processor 306-1. Execution node 302-2 includes a cache 304-2 and a processor 306-2. Execution node 302-*n* includes a cache 304-*n* and a processor 306-*n*. Each execution node 302-1, 302-2, and 302-*n* is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-*n*. Execution node 312-1 includes a cache 314-1 and a processor 316-1. Execution node 312-2 includes a cache 314-2 and a processor 316-2. Execution node 312-*n* includes a cache 314-*n* and a processor 316-*n*. Additionally, virtual warehouse 3 includes three execution nodes 322-1, 322-2, and 322-*n*. Execution node 322-1 includes a cache 324-1 and a processor 326-1. Execution node 322-2 includes a cache 324-2 and a processor 326-2. Execution node 322-*n* includes a cache 324-*n* and a processor 326-*n*.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-$n$ at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
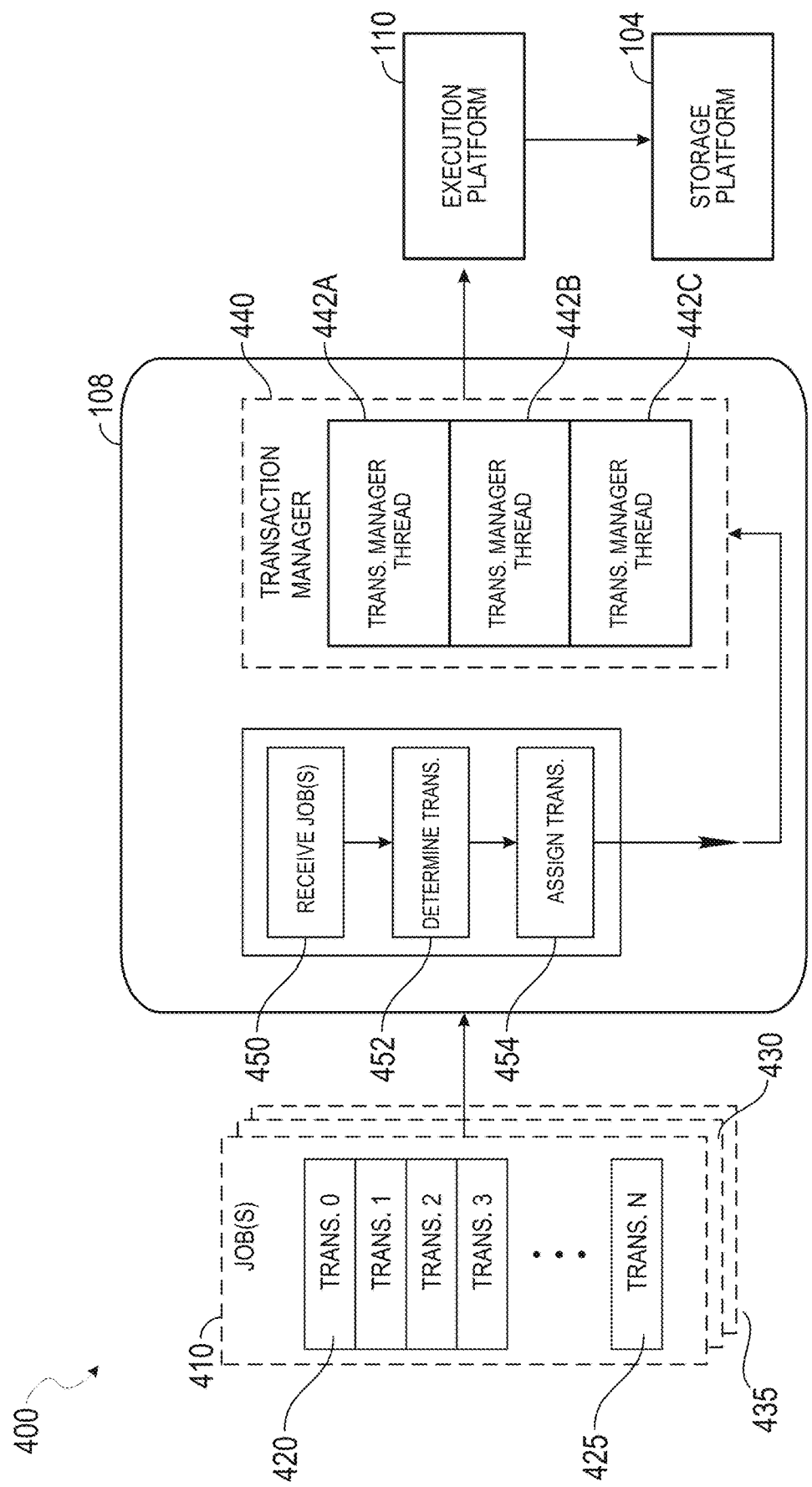
FIG. 4 is a computing environment conceptually illustrating an example software architecture for managing and executing concurrent transactions on a database system, which can be performed by a given execution node of the execution platform, in accordance with some embodiments of the present disclosure.

FIG. 4 is a computing environment 400 conceptually illustrating an example software architecture for managing and executing concurrent transactions on a database system (e.g., the network-based database system 102), which can be performed by a given execution node of the execution platform 110, in accordance with some embodiments of the present disclosure. In an embodiment, a process flow is performed by a transaction manager that is configured to manage and execute transactions as described further herein.

As shown, the transaction manager 440 is included in the compute service manager 108. The transaction manager 440 receives a job 410 that may be divided into one or more discrete transactions 420-425, e.g., transaction 0, transaction 1, transaction 2, transaction 3, and so forth through transaction (n). In an embodiment, each transaction includes one or more tasks or operations (e.g., read operation, write operation, database statement, user defined function, and the like) to perform. The transaction manager 440 receives the job at 450 and determines transactions at 452 that may be carried out to execute the job 410. The transaction manager 440 is configured to determine the one or more discrete transactions, such as transaction 0, transaction 1, transaction 2, transaction 3, and so forth, based on applicable rules and/or parameters. The transaction manager 440 assigns transactions at 454.

As further shown, the transaction manager 440 is configured to concurrently process multiple jobs that can be performed by the execution platform 110. In an example, the transaction manager 440 can receive a second job 430 or a third job 435, each of which include respective discrete transactions that are to be performed on the execution platform 110. Each of the transactions may be executed concurrently by the execution platform 110 in which different operations are performed (e.g., a respective read operation or write operation are executed from each of the transactions by the execution platform 110).

In an implementation, the job 410, including the respective transactions therein, is carried out by the transaction manager 440 which can perform the responsibilities of a query manager (e.g., processing query statements and operations, and the like). As shown, the transaction manager 440 may have multiple threads, including, for example, transaction manager threads 442a, 442b, 442c, and so forth. The transaction manager 440 may assign the job 410, including the multiple discrete transactions, to a particular virtual warehouse of the execution platform 110. Based on this assignment, the transaction manager 440 can send the job 410, including the multiple discrete transactions, to the assigned virtual warehouse for execution. Alternatively, the transaction manager 440 can send a subset of the transactions included in the job 410 for execution by the execution platform 110.

In an embodiment, as described further herein, the transaction manager 440 can perform operations to process transactions (e.g., OLTP) that may be executing concurrently, while handling conflicts and avoiding starvation of resources. Further, as described further herein, the transaction manager 440 handles conflicts between multiple transactions and concurrency issues that can arise when multiple transactions are executing in parallel on the execution platform 110. As further shown, the execution platform 110 communicates with the storage platform 104, which provides a distributed database (e.g., FoundationDB, and the like), where data can be read and written in connection with performing the transactions.

In an embodiment, the transaction manager 440 schedules and manages the execution of transactions on behalf of a client account. The transaction manager 440 may schedule any arbitrary SQL query included in a given transaction. The transaction manager 440 may assume a role to schedule the job 410 as if it is the client account rather than as an internal account or other special account. The transaction manager 440 may embody the role of, for example, an account administrator or a role having the (smallest) scope necessary to complete the job 410. In an embodiment, the transaction manager 440 embodies the role that owns the object that is the target of the job 410 (e.g., for a cluster, the table being clustered is the target).

In an embodiment, the transaction manager 440 determines transactions at 452 and assigns transactions at 454 that must be performed to fully execute the job 410. In an embodiment, the transaction manager 440 assigns ordering constraints to any number of the one or more discrete transactions, where applicable. Depending on the constraints of the job 410, the transaction manager 440 may determine that one or more of multiple discrete transactions must be serialized and executed in a particular order.

In an embodiment, the transaction manager 440 generates a report indicating when the job 410 is scheduled to be executed and how much computing resources are estimated to be tied up executing the job 410. The transaction manager 440 may alert a client account when the job 410 is being executed.

The subject technology provides concurrency control and isolation for executing transactions against (e.g., a series of SQL Statements within a SQL Transaction) against linearizable storage (e.g., a linearizable key-value store). A transaction as referred to herein includes a group of operations executed atomically. In an example, such transactions may include read and write operations but can also include operations such as increment, decrement, compare-and-swap, and the like. Further, it is appreciated that linearizable storage may include any type of distributed database (e.g., Apache HBase).

The following discussion relates to transactions in a given distributed database system. In an example, the transaction manager 440 utilizes a linearizable storage, provided by the storage platform 104, for managing and processing transactions as described herein. In an embodiment, the transaction manager 440 implements a read committed model for performing transactions. As referred to herein, a read committed model can refer to a model that ensures that all read operations performed in a given transaction sees a consistent snapshot of the database (e.g., reading a last set of committed values that existed when the read operation commenced), and the transaction itself successfully commits only if no updates that the transaction has made results in write-write conflicts with any concurrent transactions.

As discussed further herein, the transaction manager 440 implements a two-level transaction hierarchy, where a top-level transaction corresponds to a SQL transaction, and a nested transaction corresponds to a SQL statement within the parent SQL transaction. A given nested transaction can perform operations, such as reads and writes, and can perform a rollback and restart execution zero or more times before succeeding. Upon transaction commit, write operations can become visible, and write locks held by each contained statement can be released.

As mentioned before, the subject system provides concurrency control and isolation for executing a series of SQL Statements within a SQL Transaction against a linearizable storage. As discussed further herein, a transaction manager (e.g., transaction manager 440) is configured to provide a concurrency control mechanism that can be understood as a combination of multi-version concurrency control for read operations (MVCC) and locking for write operations. The subject system provides techniques for read committed isolation where each statement may execute against a different snapshot of the database (e.g., the storage platform 104), with write locks held until transaction commit.

In an embodiment, the linearizable storage as described herein enables each operation to execute atomically between invocation and response. As an example, such a linearizable key-value store ensures that operations execute in an atomic manner consistent with a "real-time" ordering of those operations e.g., when operation A completes before operation B begins, operation B should take effect after operation A. In the context of a database, a first write operation to a row in the table must take effect before a second write or read operation to the same row in the table if the second operation was issued after the first completed.

The examples described herein relate to linearizable storage such as a linearizable database, including, for example, NoSQL systems, and the like. A given NoSQL database refers to a database that stores data in a format other than a tabular format, and can store data differently than in relational tables. Further, Uber's Schemaless is an example of building linearizable Key-Value storage via having a "key" and "value" column in a relational table. Other examples of linearizable databases are: HBase, RocksDB, TiKV, Redis, Etcd.

Some examples of optimizations provided by the subject system include utilizing restricted transactional capabilities offered by some embodiments of storage platform 104, such as FoundationDB, that can be leveraged to enable a more efficient transaction implementation. For example, in a write (/lock/delete) protocol, a write operation is performed, and then a read operation is done to check for (1) any write operation that happened before the write request was submitted (2) any other write operation was submitted concurrently with the write operation that was serialized before. The following example illustrates the above:

T1 starts statement S1

S1 starts a FoundationDB Transaction, and uses its Read Version as the Read Timestamp S1 wishes to write object X, so it first reads object X as of the Read Timestamp Finding no conflicts, S1 writes X, using a timestamped operation to embed the commit timestamp in the key and setting IsCommitEmbedded.

S1 sets a read conflict range on the FoundationDB transaction for all keys with a prefix of X S1 writes a transaction status entry for ID, directly setting it to committed.

T1 commits the FoundationDB Transaction.

If the transaction commits, then there were no concurrent conflicting transactions.

If the transaction is aborted, then there was a concurrency conflicting transaction for one of the writes that were done. None of S1's writes, nor the transaction status entry will be persisted. S1 must now restart in the slow path.

In an example, a "read version" refers to a "version" or state of the database that corresponds to when a last operation was successfully committed to the database.

The following relates to a discussion of strict serializability. Whereas linearizability makes a "real-time" ordering and atomicity promise about single operations, strict serializability makes a "real-time" ordering and atomicity promise about groups of operations. In an example, the group of operations is submitted incrementally over time, with a terminal "commit" command being issued. The strictly serializable storage platform may employ techniques such as pessimistic lock-based exclusion or an optimistic validation phase to enable this functionality. In this example, the group of operations is referred to as a transaction as mentioned herein. The subject system can impose restrictions on the transaction, such as the number, size, or duration of the operations, and always reject transactions that exceed these limits.

In an embodiment, read operations may be optimized in the following manner. When reading with a given read timestamp, it may not be feasible for any transaction started after the read timestamp to commit before the read timestamp. Thus, if the Transaction ID is set to be the same as the first statement's read timestamp, then instead of reading [X.0, X.inf], the subject system can read [X.0, X.readTimestamp]. Consequently, this approach can make read operations for old or frequently written data more efficient.

In an embodiment, the subject system implements a two-level transaction hierarchy, where the top-level transaction corresponds to a SQL Transaction, and the nested transaction (referred to as a "StatementContext") corresponds to a SQL statement within the parent SQL Transaction. A given StatementContext performs read and write operations and may be instructed to perform a rollback and restart execution zero or more times before succeeding. In an example, transactions control the collective visibility of all write operations from successful statements. Upon transaction commit, all write operations become visible, and all write locks held by each contained statement are released.

In an embodiment, each object key is associated with a stamp that uniquely identifies a single execution attempt of a statement, which can be by appending a three-part tuple of (Transaction ID, statementNumber, restartCount). The higher order component is the transaction identifier assigned to the SQL-level transaction. The statementNumber identifies the SQL statement within the SQL-level BEGIN/COMMIT block. The restart count tracks which statement restart attempt generated this write operation. A StatementContext is instantiated with this stamp, and applies it to all writes performed through the StatementContext instance.

In embodiments, object keys are "stamped" by appending additional information to each key. In an example, a stamp includes a three-part tuple of (Transaction ID, statementNumber, restartCount) along with other information. The higher order component is a transaction identifier assigned to the SQL-level transaction. The statementNumber identifies the SQL statement within the SQL-level BEGIN/COMMIT block. The restart count tracks which statement restart attempt generated this write. In an implementation, a StatementContext is instantiated with this stamp, and applies it to all writes performed through the StatementContext instance.

Stamping keys this way has a number of desirable properties. First, if key1 <key2, then key1.suffix1 <key2.suffix2, regardless of the values of suffix1 and suffix2. If key1==key2, then the transactionID component of the suffix allows us to resolve the commit status of the object to determine its visibility to the statement. If transactionID1==transactionID2, then Statement Number allows statements to see writes performed by previous statements within the same transaction. The restartCount component of the suffix enables the system to detect and delete obsolete versions of the object that had been left around when a statement has to be restarted.

In a similar fashion each execution of a statement is given a three-part identifier consisting of the statement's readTimestamp (RTS) and the current values of statementNumber (SN) and restartCount (RC). This approach ensures that each statement that is part of the execution of a SQL statement (or more generally a SQL Transaction), sees either data committed before the SQL statement started or by data written or updated by the transaction itself.

In an embodiment, the transaction manager 440 employs a Transaction Status Table (TST) to keep track of committed and aborted transactions. The TST is a persistent hashmap that maps Transaction ID to its metadata, most notably a list of finalized statement numbers and their final restart count, and the commit outcome including the transaction's commit timestamp (CTS). Transactions that are in progress do not exist in the Transaction Status Table. In an embodiment, the TST can be stored in the storage platform 104, or within memory or cache of the execution platform 110.

The following discussion relates to a read protocol that is utilized by the transaction manager 440.

In an embodiment, the transaction manager 440 uses a read committed transaction isolation level, and each statement may be run with a different read timestamp. In an example, the read request for a given key (or a range of keys) is implemented by executing a linearizable storage read call for all keys with X as their prefix. The call returns versions of X with their stamps and values. The read method returns either the latest version of X made by a transaction that committed before the SQL statement started or which was written by the most recent statement of the transaction itself that was not canceled (if any).

There is no need to check for WR conflicts. To illustrate, consider the following example.

Assume that a pre-existing object X had been written with a stamp of TXN1.0.0, with a commit timestamp of 10.

T2 begins, and creates an instance S1 of a StatementContext with the stamp (ID=TXN2, statementNumber=1, restartCount=0).
//Assume the constructor for the statement obtains a readTimestamp (RTS) of 15.
S1 issues a read for all keys with a prefix of "X.", reading all versions and their stamps for X.
The read returns [X.TXN1.0.0].
S1 looks up the TxnID of TXN1 in the Transaction Status Table, and sees that it has a commit timestamp of 10. Since 10<15.1.0, X is visible to T2.
// As no writes were done, S1 does not require finalize( ) nor does T2 need to commit( ).

The following discussion relates to a write protocol that is utilized by the transaction manager 440.

In an embodiment, the write protocol checks both for WW (write-write) conflicts and WW deadlocks. The following example describes a single transaction and no conflicts. Assume that object X initially has a stamp of TXN1.0.0 and was committed at timestamp 10. In the following example, it should be understood that the following transactional steps described further below can be done within one transaction, and collectively committed. On failure, or upon exceeding the limitations of the underlying transactional system, the execution can fall back to issuing the operations individually as described in further detail below.

T2 starts and creates S1 of StatementContext(ID=TXN2, Statement Number=1, restartCount=0)
Assume that the constructor obtains a read timestamp from the linearizable storage of 15 by contacting the clock service 130. As mentioned before, the clock service 130 is a component of the storage platform 104 which can be contacted to fetch a number that will be greater than any number previously returned, such as one that correlates to the current time. In an embodiment, clock service 130 is provided separately and is independently contactable from the linearizable storage, or can be integrated into the linearizable storage such that the clock value may be inserted into a written value. The latter operation will be referred to as a timestamped write.
To update value of X, the following sequence of actions is performed in an embodiment:
{
  S1 starts a transaction
  S1 writes X.TXN2.1.0 with a value of 100 S1 commits the transaction {
  // The next step is for S1 to check for WW conflicts by checking whether there is
  // another transaction that has updated X between the RTS and S1's write.
  S1 starts an transaction
  S1 issues the range read [X.0, X.inf] to obtain the set all versions of X and their stamps
  The read returns [X.TXN1.0.0, X.TXN2.1.0].
  S1 looks up TXN1 in the Transaction Status Table, finds a commit timestamp of 10.
  10 is earlier than our read timestamp of 15, so it is not a conflict. S1 ignores [X.TXN2.1.0] as it belongs to S1
  S1 commits the transaction
  // Assume for now, there were no conflicts detected S1 starts a transaction
  S1 finalizes, and records (statement number=1, restart count=0) into the transaction status table for TXN2
  S1 commits the transaction
}
T2 commits. This will cause the Transaction Status Table record to be updated in linearizable storage to reflect that TXN2 is now committed and its commit timestamp of 20.

At this point there will be two versions of X, one stamped with TXN1.0.0 and the other TXN2.1.0. Subsequent transactions that read X can determine if this new version of X was written by a committed transaction by reading the transaction status record, and determine the CTN of the transaction.

Unlike traditional database systems, the subject system may not include have a dedicated lock manager. Instead, in an example, a transaction will first write a key and then perform a range read to detect conflicts. The lock order of a key for a transaction is determined based on the first time the key was written by the transaction (unless the statement that wrote the key was explicitly aborted, which would release all acquired locks). The write protocol for transaction T is further discussed in the following.

In an implementation, each row (object) updated requires two separate transactions:
  1) The first transaction of T inserts a new version of the object with its key X suffixed with three-part suffix (T.ID, T.statementNumber, T.restartCount).
  2) The second transaction issues a range read with the prefix "X." to obtain the SCT (set of conflicting transactions). The resuk set is a list of committed or active transactions who wrote X before T, i.e., their lock order is before T. The conflicting transactions T1 in the SCT can be classified as follows:
    i) T1 has committed before T's read timestamp. In this case, T and T1 do not have WW (write-write) conflicts and T1 can be safely ignored.
    ii) T1 has committed after T's read timestamp. In this case, T and T1 have WW conflicts and T has to restart the current statement without waiting for T1.
    iii) T1 is still active. In this case T and T1 have WW conflicts and T has to wait until T1 completes before it can restart the current statement.

In general, when there are WW conflicting transactions, the transaction T has to wait for all these transactions to complete and then restart the current statement. As mentioned herein, when a statement is restarted, the acquired locks are not released. Thus, the subsequent execution of the statement can more likely succeed.

The following relates to a more complex example that illustrates a WW conflict. To simplify the example, stamps are omitted. Assume that before either T1 or T2 starts that object X has a value of 500, a stamp of TXN1.0.0, and a CTN of 10 as illustrated in the following:
  T1 starts and gets a read timestamp of 15
  T2 starts and gets a read timestamp of 20
  T2 writes (key=X.T2, value=100)
  T2 issues an FDB read with range [X.0, X. Inf]. The set SCT will be empty so
  T2 continues
  T1 writes (key=X.T1, value=50)
  T1 issues an FDB read with range [X.0, X. Inf]. The set SCT will contain T2 so T1 must restart
  T2 successfully commits. T1's CTN for X will be >20. Assume it is 21
  After waiting until T2 either commits or aborts, T1 restarts the statement with a read TS>21.

The following discussion relates to a delete protocol utilized by the transaction manager 440.

In an embodiment, delete operations are implemented as a write of a sentinel tombstone value; otherwise, delete operations employ the same protocol as write operations. When a read operation determines that the most recently committed key is a tombstone, it considers that key to be non-existent.

The following discussion relates to a lock protocol utilized by the transaction manager 440.

To support a query statement of SELECT . . . FOR UPDATE, the transaction manager API offers StatementContext::lock(Key), which allows rows to be locked without writing a value to them. The implementation of lock( ) follows the write protocol, except that it writes a special sentinel value to indicate the absence of a value (distinct from SQL NULL). A SELECT . . . FOR UPDATE statement may also be forced to restart several times before the statement finishes successfully. Once it does, subsequent statements in the transaction will recognize the existence of this key as an indication that they hold the lock (in accordance with cases (5) and (6) above). All reads can ignore the key as a write.

The following discussion relates to determining whether to commit, abort, or restart a given transaction which can be determined by the transaction manager 440.

When a transaction finishes its execution, it will either have an empty SCT, indicating that the commit can proceed, or an SCT with one or more conflicting transactions, indicating that the transaction will need to restart.

When a statement is restarted, all writes stamped with a lower restartCount are left in the database (e.g., the storage platform 104) as provisional write locks for the next execution. The next execution of the statement might write a different set of keys. The set difference between the first and second execution form a set of orphaned writes that must be removed and never become visible. The statement itself may not be relied upon to always be able to clean up its own orphaned writes, as in the event of a process crash, the location of the previous writes will have been forgotten. Finalizing statements and recording the restart count of the successful execution promises that only the results of one execution will ever become visible, and permits orphaned writes to be lazily cleaned up.

A transaction is committed, and all of its writes made visible, by inserting its Transaction ID into the Transaction Status Table. The commit timestamp is filled in by the clock service 130 or directly by the distributed database (e.g., FoundationDB), such that it is higher than any previously assigned read or commit timestamps. All writes must have completed before a statement may be finalized, and all statements must be finalized before the transaction may be committed.

A transaction is aborted by inserting its Transaction ID into the Transaction Status Table, with its commit timestamp set to a sentinel invalid value to indicate an abort. The list of finalized statements and their restart counts will be reset to an empty list. The insertion into the Transaction Status Table will make the abort outcome visible to all conflicting transactions, and all writes performed by finalized statements may be proactively or lazily removed from the database (e.g., the storage platform 104).

When a statement tries to finalize with a non-empty SCT, it waits for commit outcomes to be persisted to the Transaction Status Table for all conflicting transactions. Once all conflicting transactions have committed or aborted, then the transaction will begin its restart attempt.

The following discussion relates to an API (e.g., the transaction manager API as referred to below) that can be utilized (e.g., by a given client device) to send commands and requests to the transaction manager 440.

A SQL transaction contains a sequence of one or more SQL statements. Each SQL statement is executed as a nested transaction, as implemented by the transaction manager StatementContext class. Each transaction manager statement itself is executed as one or more database transactions.

In an embodiment, the transaction manager API is divided into two parts: 1) the data layer, which provides a read and write API to the transaction execution processes; and 2) the transaction layer, which provides, to the compute service manager 108, an API to orchestrate the transaction lifecycle. In an implementation, transactions operate at a READ COMMITTED isolation level and implement MVCC on top of the distributed database (e.g., storage platform 104) to avoid taking any read locks.

The basis for this interface is the following statement class:

```
TransactionResult The transaction manager 440 ::BeginTransaction(ID);
TransactionResult The transaction manager 440 ::PrepareTransaction(ID);
// Used for 2PC
across FDB and FDN
TransactionResult The transaction manager 440 ::CommitTransaction(ID);
TransactionResult The transaction manager 440 ::AbortTransaction(ID);
class StatementContext
public:
    StatementContext(ID transactionID, int sqlStatementNumber, int
restartCount);
    Future<Cursor> read(Key key);
    Future<Cursor> readRange(Key from, Key to);
    Future<void> insert(Key, Value value);
    Future<void> update(Key, Value value);
    // Equivalent to calling insert( )/update( ) once per item.
    Future<void> bulkInsert(std::vector<std::pair<Key, Value>> data);
    Future<void> bulkUpdate(std::vector<std::pair<Key, Value>>
    Future<void> lock(Key key);        // Used for SELECT . . . FOR UPDATE
    Future<void> delete(Key key);
    // StatementContext "commit"
    enum Result {FINALIZED, ABORTED, RESTARTED,
DEADLOCKED};
    Result finalize( );
private:
    ID transactionID;
```

```
Private int statementNumber; Private int restartCount = 0;
Timestamp readTimestamp;
// Conflict Management Bool hasConflicts( );
Std::vector<Timestamp> getConflictingIDs( );
}
```

Consider the following example SQL query:
Update emp.Salary=emp.Salary*1.1 where emp.Dept="shoe";

In an example, an instance of the StatementContext class will be created to execute this SQL statement. The constructor contacts the linearizable storage transaction manager to begin a linearizable storage transaction and obtain a linearizable storage STN which is then stored in the readTimestamp variable.

The Update operation then executes across any number of execution nodes, all using the same StatementContext instance. In an example, a function rangeRead( ) will be used to scan the base table, or an index on Dept, for the tuples to update. A series of write( ) calls will be made to update the salary of all matching employees.

A call to finalize( ) will return CONFLICT if the statement encountered any conflicts during its execution, to indicate that re-execution is needed. The key to restart making progress is that the first execution of the statement will have the side effect of, in effect, setting write locks on the objects being updated. This ensures that when the statement is re-executed the necessary writes locks have already been obtained and the statement will generally (but not always).

The following discussion relates to a key format in accordance with some embodiments of the subject technology.

In discussions herein, the subject system has been assumed as operating on a potentially infinitely sized key/value pair. However, in some implementations, the subject system utilizes a distributed database (e.g., FoundationDB ("FDB"), and the like), which can impose a set of restrictions e.g., keys must be 10 KB or less, values must be 100 KB or less, a single transaction should not exceed 1 MB (and cannot exceed 10 MB).

In an implementation, the subject system may be subjected to a key size limit (e.g., 10 KB) as part of its API. Further, the subject system supports values that exceed a threshold upper/larger size (e.g., 100 KB), as a single SQL row can be one or more MB in size. This means that the subject system is enabled to split a large value across a number of key/value pairs.

The subject technology, in some embodiments, supports two key formats. Initially all transactions will write keys (e.g., to the key/value store) using the format below:

UserKey, (TxnID, Statement, RestartCount), (Control Bits), (Worker ID, WriteNum), (Part Number, isFinalPart), WriteTs, isCommitEmbedded User Key is the key that the user provided in the call into the subject system.

TxnId, Statement, RestartCount is the stamp associated with the object. Note that RestartCount comprises gsAttemptCount and xpRestartCount.

The Control Bits has three flags in it
An IsLock flag used to indicate that this key should be skipped for reads
An IsTombstone flag used to indicate that a reader should consider the key as absent Worker ID and WriteNum are used to guarantee that a statement (which may be executed on multiple workers in parallel) cannot write duplicate keys.

Part Number is for sharding values across multiple key-value pairs. Values will be split into 100 KB chunks, and each chunk will be written with a sequentially increasing Part Number. This allows for a range scan to concatenate sequential values that have the same (Key, TxnID, Statement, RestartCount, Control Bits) to yield the original value.

IsFinalPart: set to true on the last key for an object.

WriteTs: a generated monotonically increasing timestamp to indicate when a key-value pair is persisted in the database (e.g., FDB and the like). This is used to implement the lock ordering in the subject system.

IsCommitEmbedded: indicate that the commit timestamp is directly embedded in the key If IsCommitEmbedded is set, then the format of the key will be:

User Key, Commit Timestamp, Control Bits, (Part Number, isFinalPart), IsCommitEmbedded The following discussion relates to a transaction status table (TST).

A Transaction Status Table (TST) stores the status of committed, pending, and aborted transactions. In an embodiment, the TST is implemented as a key-value table in a distributed database (e.g., FDB) with a reserved, special name and is maintained per account. The key format, in an example, will be:

(account ID, transaction ID)

In an embodiment, the value format will be:

(status, (<statement, state, restartCount>), commit timestamp)

status: stores the transaction status, including COMMITTED, ABORTED, or PENDING

<statement, state, restartCount>: stores a list of statement numbers, their current states, and the restart counts. Statement states include PENDING, FINALIZED, and ABORTED.

commit timestamp: the final commit timestamp of the transaction. (only for COMMITTED transactions)

The TST is updated whenever a transaction is committed or aborted, or whenever a statement is finalized. In an embodiment, TST updates are implemented using a special compareAndSet operation, instead of blind updates, to ensure that the outcome of a transaction/statement is final once set. For example, if a transaction has already been committed, then aborting it subsequently will become a no-op. This is important to ensure the subject system's correctness in the presence of shadow execution node instances where multiple execution node workers may finalize the same statement concurrently with different restart counts.

Thus, when a statement fails to finalize due to conflicts, it instead writes its conflict set into the database (e.g., the storage platform 104). These conflict sets may be read by all other transactions, allowing them to detect a cycle in the waits-for graph, indicating that they're involved in a deadlock.

Figure 5:
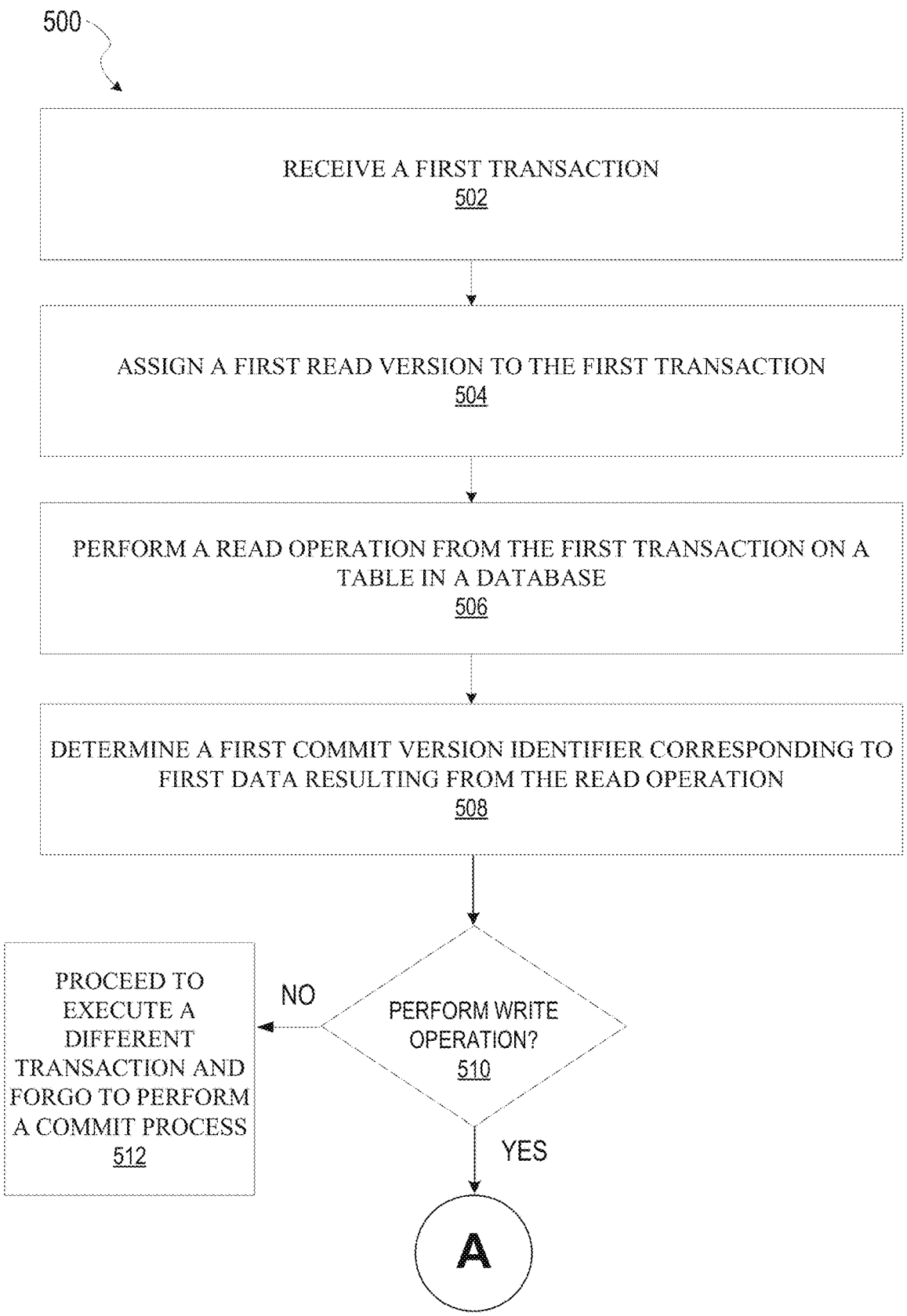
FIG. 5 is a flow diagram illustrating operations of a database system in performing a method, in accordance with some embodiments of the present disclosure.

FIG. 5 is a flow diagram illustrating operations of a database system in performing a method, in accordance with some embodiments of the present disclosure. The method 500 may be embodied in computer-readable instructions for execution by one or more hardware components (e.g., one or more processors) such that the operations of the method 500 may be performed by components of network-based database system 102, such as components of the compute service manager 108 or a node in the execution platform 110. Accordingly, the method 500 is described below, by way of example with reference thereto. However, it shall be appreciated that the method 500 may be deployed on various other hardware configurations and is not intended to be limited to deployment within the network-based database system 102.

At operation 502, the transaction manager 440 receives a first transaction, the first transaction to be executed on linearizable storage.

At operation 504, the transaction manager 440 assigns a first read version to the first transaction, the first read version indicating a first version of the linearizable storage. Alternatively, a read timestamp can be retrieved from a clock service (e.g., the clock service 130), and a transaction identifier can be assigned to the first transaction where the transaction identifier corresponds to a read start time.

At operation 506, the transaction manager 440 performs a read operation from the first transaction on a table in a database.

At operation 508, the transaction manager 440 determines a first commit version identifier corresponding to first data resulting from the read operation.

At operation 510, the transaction manager 440 determines whether a particular write operation is included in the first transaction. If the particular write operation is to be performed with the first transaction, then the transaction manager 440 proceeds to perform a method as described below in FIG. 7.

Alternatively, when the transaction manager 440 determines that a particular write operation is absent from the first transaction, at operation 512, the transaction manager 440 proceeds to execute a different transaction (along with foregoing to perform a commit process for the first transaction), which is described, in an example, in FIG. 6 below. It is appreciated that due to the concurrency of transactions that are performed, the operations described further below in FIG. 6 can be executed at any time during the operations described in FIG. 5 above.

Figure 6:
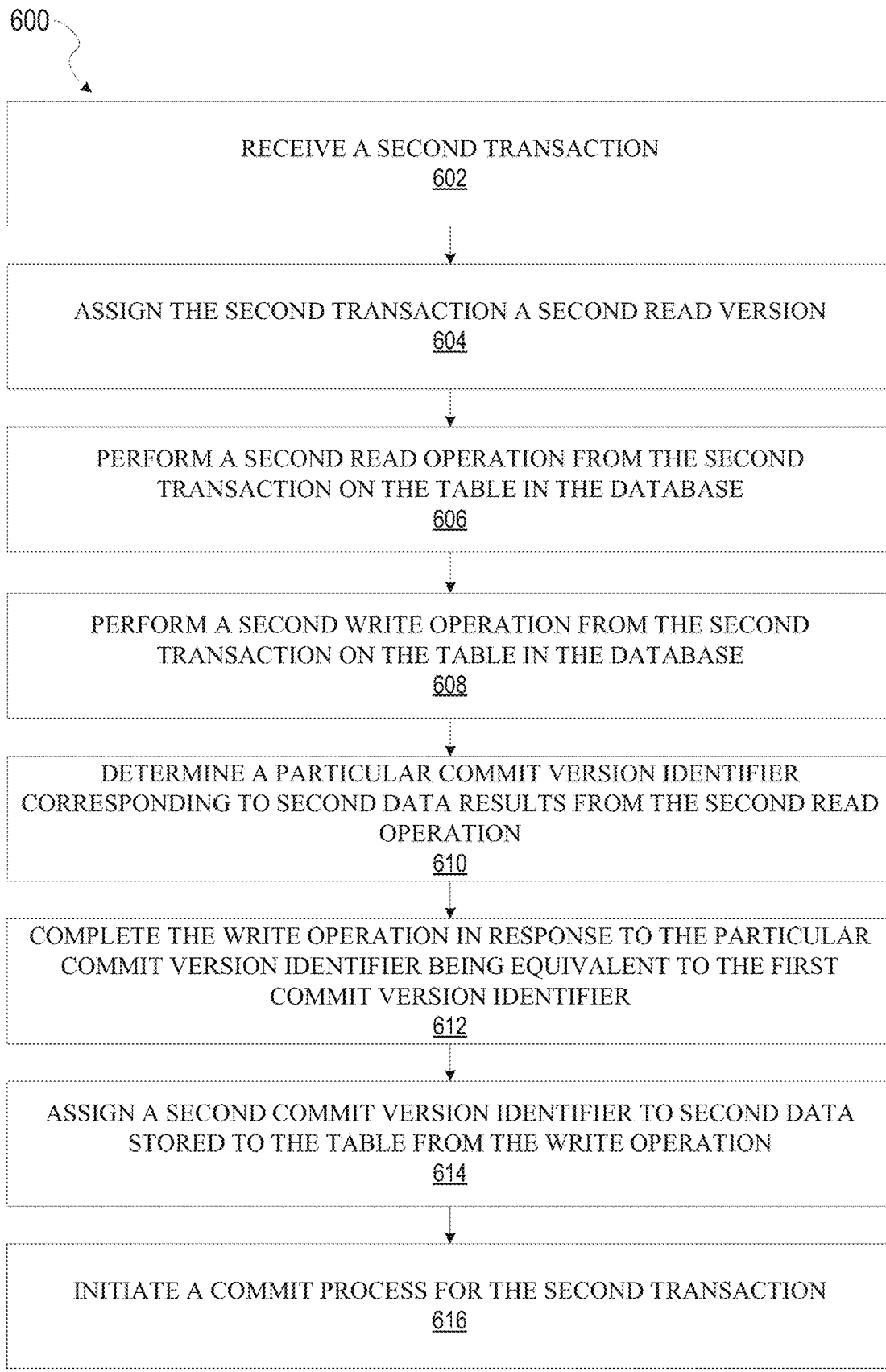
FIG. 6 is a flow diagram illustrating operations of a database system in performing a method, in accordance with some embodiments of the present disclosure.

FIG. 6 is flow diagram illustrating operations of a database system in performing a method, in accordance with some embodiments of the present disclosure. The method 600 may be embodied in computer-readable instructions for execution by one or more hardware components (e.g., one or more processors) such that the operations of the method 600 may be performed by components of network-based database system 102, such as components of the compute service manager 108 or a node in the execution platform 110. Accordingly, the method 600 is described below, by way of example with reference thereto. However, it shall be appreciated that the method 600 may be deployed on various other hardware configurations and is not intended to be limited to deployment within the network-based database system 102.

In some embodiments, the method 600 can be performed in conjunction with the method 500 as discussed above. For example, the method 600 can be performed after the operations of the method 500 or performed substantially concurrently with the method 500.

At operation 602, the transaction manager 440 receives a second transaction, the second transaction to be executed on linearizable storage.

At operation 604, the transaction manager 440 assigns the second transaction a second read version, the second read version indicating a second version of the linearizable storage.

At operation 606, the transaction manager 440 performs a second read operation from the second transaction on the table in the database.

At operation 608, the transaction manager 440 performs a second write operation from the second transaction on the table in the database.

At operation 610, the transaction manager 440 determines a particular commit version identifier corresponding to second data results from the second read operation.

At operation 612, the transaction manager 440 completes the write operation in response to the particular commit version identifier being equivalent to the first commit version identifier.

At operation 614, the transaction manager 440 assigns a second commit version identifier to second data stored to the table from the write operation, the second commit version identifier corresponding to a second version of data in the table, the second commit version identifier different than the first commit version identifier.

At operation 616, the transaction manager 440 initiates a commit process for the second transaction.

Figure 7:
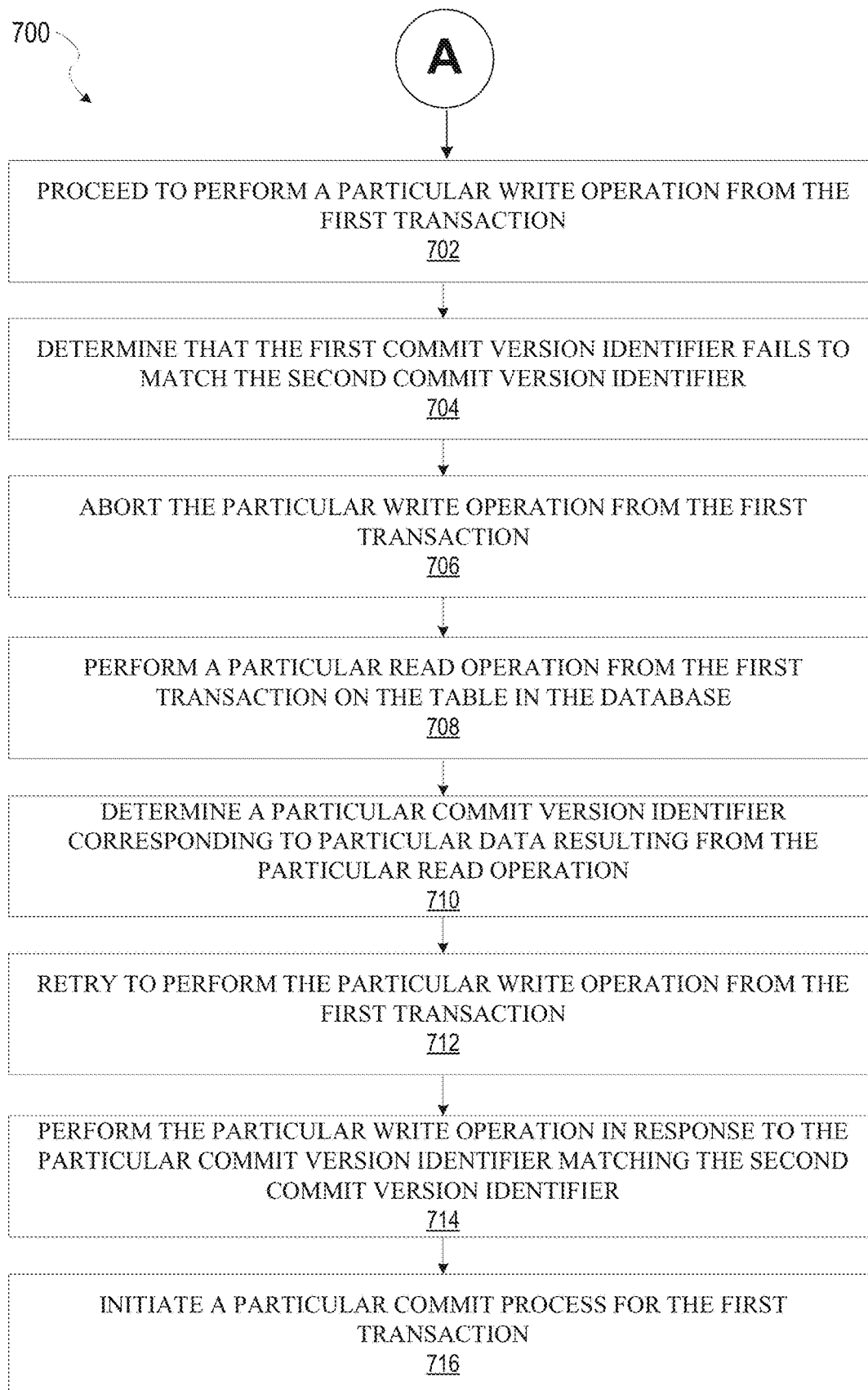
FIG. 7 is a flow diagram illustrating operations of a database system in performing a method, in accordance with some embodiments of the present disclosure.

FIG. 7 is a flow diagram illustrating operations of a database system in performing a method, in accordance with some embodiments of the present disclosure. The method 700 may be embodied in computer-readable instructions for execution by one or more hardware components (e.g., one or more processors) such that the operations of the method 700 may be performed by components of network-based database system 102, such as components of the compute service manager 108 or a node in the execution platform 110. Accordingly, the method 700 is described below, by way of example with reference thereto. However, it shall be appreciated that the method 700 may be deployed on various other hardware configurations and is not intended to be limited to deployment within the network-based database system 102.

In some embodiments, the method 700 can be performed in conjunction with the method 500 and the method 600 as discussed above. For example, the method 700 can be performed after the operations of the method 500 or the method 600 (or performed substantially concurrently therewith either method).

At operation 702, the transaction manager 440 proceeds to perform a particular write operation from the first transaction.

At operation 704, the transaction manager 440 determines that the first commit version identifier fails to match the second commit version identifier.

At operation 706, the transaction manager 440 aborts the particular write operation from the first transaction.

At operation 708, the transaction manager 440 performs a particular read operation from the first transaction on the table in the database.

At operation 710, the transaction manager 440 determines a particular commit version identifier corresponding to particular data resulting from the particular read operation.

At operation 712, the transaction manager 440 retry to perform the particular write operation from the first transaction.

At operation 714, the transaction manager 440 perform the particular write operation in response to the particular commit version identifier matching the second commit version identifier.

At operation 716, the transaction manager 440 initiates a particular commit process for the first transaction.

As discussed herein, embodiments of the subject technology provide support for deferred constraint in hybrid tables to enable postponing constraint validation until the end of a statement or transaction execution. In an example, the subject technology resolves an undefined result issue in parallel execution on constraint validation or help the user to simplify their database usage to use the deferred constraint.

In some existing systems, constraint validation for hybrid tables (e.g., key-value tables stored on linearizable storage provided by a distributed database such as FoundationDB) is performed at a row level, i.e., the constraint check occurred after each row operation. If a given row operation violates a constraint, the statement execution will fail immediately. As referred to herein, a constraint refers to a mechanism for defining integrity and consistency rules for data stored in tables, which can be checked against (e.g., enforced) to determine if a given constraint has been violated.

Take the below statement as an example, suppose row (1, 1) and (2, 2) in the table. The UPDATE statement will first update (1, 1) to (1, 2) and try to add the row (1,2) which will fail immediately since there is a duplicate value on column col_a but the row (2,2) is about to be updated too.

CREATE HYBRID TABLE tbl (id int PRIMARY KEY, col_a int unique);
UPDATE tbl set col_a=col_a+1;

In an example, a statement could manipulate millions of rows and the execution could temporarily violate the constraint but as long as the final result does not violate the constraint, the constraint is still valid. However, in existing approaches that use a row level validation model (as discussed before), this scenario could not be supported in an effective manner.

In an implementation, a given table can have multiple unique keys and foreign keys, but only one primary key. All foreign keys must reference a corresponding primary or unique key that matches the column types of each column in the foreign key. The primary key for a foreign key can be on a different table or the same table as the foreign key.

During large transaction involving multiple dependencies, it is often difficult to process data efficiently due to the restrictions imposed by the constraints. An example of this would be the update of a key which is referenced by foreign keys. The key column cannot be updated as this would orphan the dependent tables, and the dependent tables cannot be updated prior to the parent table as this would also make them orphans.

CREATE HYBRID TABLE parent (id int PRIMARY KEY, col int UNIQUE);
CREATE HYBRID TABLE child (id int PRIMARY KEY, c_col int REFERENCES parent (col)); Parent: (1, 1)
Child: (1, 1)
BEGIN;
UPDATE parent set col=101 where col=1;
UPDATE child set c_col=101 where c_col=1;
COMMIT;

In database systems that support self reference foreign keys, or support parallel execution for hybrid tables, different execution order(s) could cause different results for the self reference case, and therefore could cause inconsistent behavior (e.g., resulting in buggy behavior from a user's perspective).

CREATE HYBRID TABLE category (c_id int PRIMARY KEY, c_parent_id int
REFERENCES category (c_id)); INSERT INTO category VALUES (1, 1), . . . , (3, 1);

The above example case simulates the issue in a data loading scenario. Depending on the execution order, rows (1, 1) and (3, 1) may execute on different execution node (XP) instances and may be inserted in different orders, the insert of (3, 1) may or may not violate the referential integrity so the statement may or may not fail. The same case could happen for normal foreign key constraints since multiple tables insert statements are supported.

The subject technology provides deferred constraint validation support therefore can resolve the above example cases as described further herein.

The following discussion relates to constraint validation levels.

The constraint validation can be done at three different levels: row, statement and transaction:

Row level validation: if a row operation in the statement violates the constraint, the statement will fail immediately.

Statement level validation: the constraint is guaranteed to be valid after the statement finalizes, but it is possible to have some temporarily violating rows within the statement execution.

Transaction level validation: the constraint is guaranteed to be valid after the transaction is committed. If the transaction is a multi-statement transaction, it is allowed that a statement breaks the constraint. If there are violating rows during commit, the transaction will be rolled back.

In an implementation, the following example syntax exposes deferred constraints even though constraints are not enforced for standard tables. In example syntax, it can be specified whether a constraint is deferrable/not deferrable, or initially immediate/deferred.

DEFERRABLE/NOT DEFERRABLE: specifies whether the constraint check can be deferred until the transaction is committed.

INITIALLY IMMEDIATE/DEFERRED: specified whether the check for constraints are deferred or not (only valid if the constraints are defined as DEFERRABLE)

In an implementation, hybrid table constraints are created as NOT DEFERRABLE by default and all the constraint validation for hybrid tables are done at the row-level. As the subject technology provides deferred constraint support, validation level under different deferability types are specified which is discussed further below.

Change the default behavior (i.e., NOT DEFERRABLE) to statement-level validation for all constraint types. And use the statement-level validation for the constraints that are deferrable but the check is IMMEDIATE.

With the proposal, the constraints validation will take place at the end of the statement execution for non-deferrable and deferrable immediate constraints.

The following table shows the proposed behavior for all the constraint types:

| Constraint Type | NOT DEFERRABLE | IMMEDIATE | DEFERRED |
| --- | --- | --- | --- |
| PRIMARY KEY | statement | statement | transaction |
| UNIQUE | statement | statement | transaction |
| FOREIGN KEY | statement | statement | transaction |

The following discussion relates to following user surfaces to support the creation, alteration and modification of the constraint with deferability.

For creating a table with constraints deferability, a constraint property is extended at the end of the constraint definition. In an example, the constraint can be defined both inline and out-of-line and the DEFERRABLE, INITIALLY IMMEDIATE/DEFERRED keywords are added in the constraint property.

Create Table Syntax:
CREATE TABLE <name>{<col_name> <col_type> [PRIMARY KEY|UNIQUE|Constraint <c_name> Constraint Property], <col_name> <col_type> . . . }
CREATE TABLE <name>{<col_name> <col_type>, <col_name> <col_type>, [PRIMARY KEY|UNIQUE|Constraint <c_name> (col_name, <col_name>) Constraint Property, . . . };
Constraint Property:
NOT DEFERRABLE|DEFERRABLE INITIALLY IMMEDIATE|DEFERRABLE INITIALLY DEFERRED The following relates to changing the deferability for a constraint.

Embodiments of the subject technology supports the alter table statement by which the user can modify the deferability of a constraint, e.g. from not deferrable to deferrable.
ALTER TABLE <table> ALTER|MODIFY <constraint> NOT DEFERRABLE|DEFERRABLE INITIALLY IMMEDIATE|DEFERRABLE INITIALLY DEFERRED The following relates to a SET CONSTRAINT statement.

Embodiments of the subject technology can also support updating the deferability on the fly just for a current transaction. This can be useful in case that the constraint is defined as DEFERRABLE INITIALLY IMMEDIATE and this will be the constraint check type by default, and the user can change to DEFERRED on demand. Further, the same SET CONSTRAINT statement for hybrid tables can be used in an example.
SET CONSTRAINT[S] {ALL|name [, . . . ]} {DEFERRED|IMMEDIATE}

In an implementation, the SET CONSTRAINT statement includes the following semantics:
1. SET CONSTRAINT can only work for the constraint which is defined as deferrable.
2. SET CONSTRAINT can only run within a transaction block
3. SET CONSTRAINT can only run at the beginning of a transaction
4. When ALL is specified, it will change all the constraints used in the current transaction defined as deferable.
5. Once the transaction is committed or rolled back, the SET CONSTRAINT effect will be cleared.

The below examples show how the SET CONSTRAINT works which will change the constraints validation to deferred at the transaction level.
CREATE HYBRID TABLE country (id int PRIMARY KEY, capital_id int); CREATE HYBRID TABLE city (id int PRIMARY KEY, country_id int);
ALTER TABLE country ADD CONSTRAINT fk1 FOREIGN KEY (capital_id) REFERENCEs city (id) DEFERRABLE INITIALLY IMMEDIATE);
ALTER TABLE city ADD CONSTRAINT fk2 FOREIGN KEY (country_id) REFERENCES country (id) DEFERRABLE INITIALLY IMMEDIATE;
BEGIN;
. . .
INSERT INTO country VALUES (1, 10); —fail ROLLBACK;
BEGIN;
SET CONSTRAINTS ALL DEFERRED;
INSERT INTO country VALUES (1, 10);—pass
INSERT INTO country VALUES (10, 1);—pass
COMMIT;

The following relates to supporting a Statement Deferred Constraint.

A statement level validation can be performed if the constraint is defined as NOT DEFERRABLE, or DEFERRABLE but the check is IMMEDIATE. In order to support this, the following is provided as discussed below.

Figure 8:
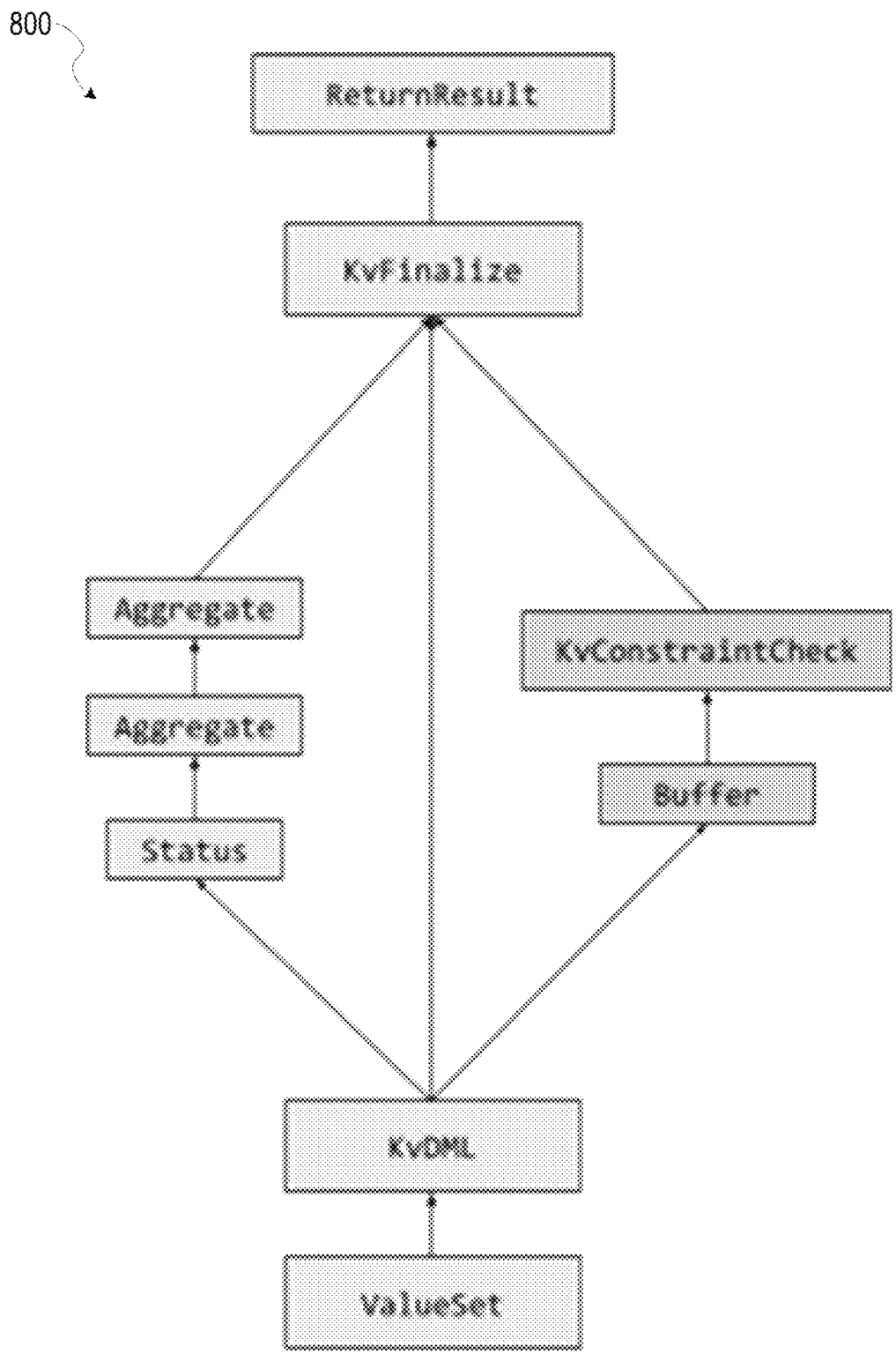
FIG. 8 illustrates an example of a query plan including a key value constraint check rowset operator (RSO), in accordance with an embodiment of the subject technology.

FIG. 8 illustrates an example of a query plan including a key value constraint check rowset operator (RSO), in accordance with an embodiment of the subject technology.

In an implementation, a KvConstraintCheck RSO (rowset operator) is provided and a query plan 800 is updated to include the KvConstraintCheck RSO.

Initially, a KvConstraintCheck RSO is provided that performs the constraint validation for the DMLs (Data Manipulation Language including operations such as INSERT, UPDATE, DELETE, MERGE) of hybrid table(s). The DML RSOs will perform the bulk write operations and perform the constraint and conflict checking in an implementation.

Instead of throwing the constraint violation exception if the constraint check fails, the DML RSOs will continue processing and obtain all the violating keys. DML RSOs will send the violating keys to the KvConstraintCheck RSO and the KvConstraintCheck RSO will check these violating keys to see if the constraint violation still exists.

If the constraint check now fails, the KvConstraintCheck will terminate with an exception showing that the constraint is failed, otherwise the KvConstraintCheck will succeed. As further illustrated, a Buffer operation is included in query plan 800 that ensures the KvConstraintCheck will only start after all the KvDML finishes, if the constraint check relies on the writes of all the KvDMLs.

As discussed below, the following examples describe the details in order to support the statement level deferred constraint for different statement and constraint types.

Figure 9:
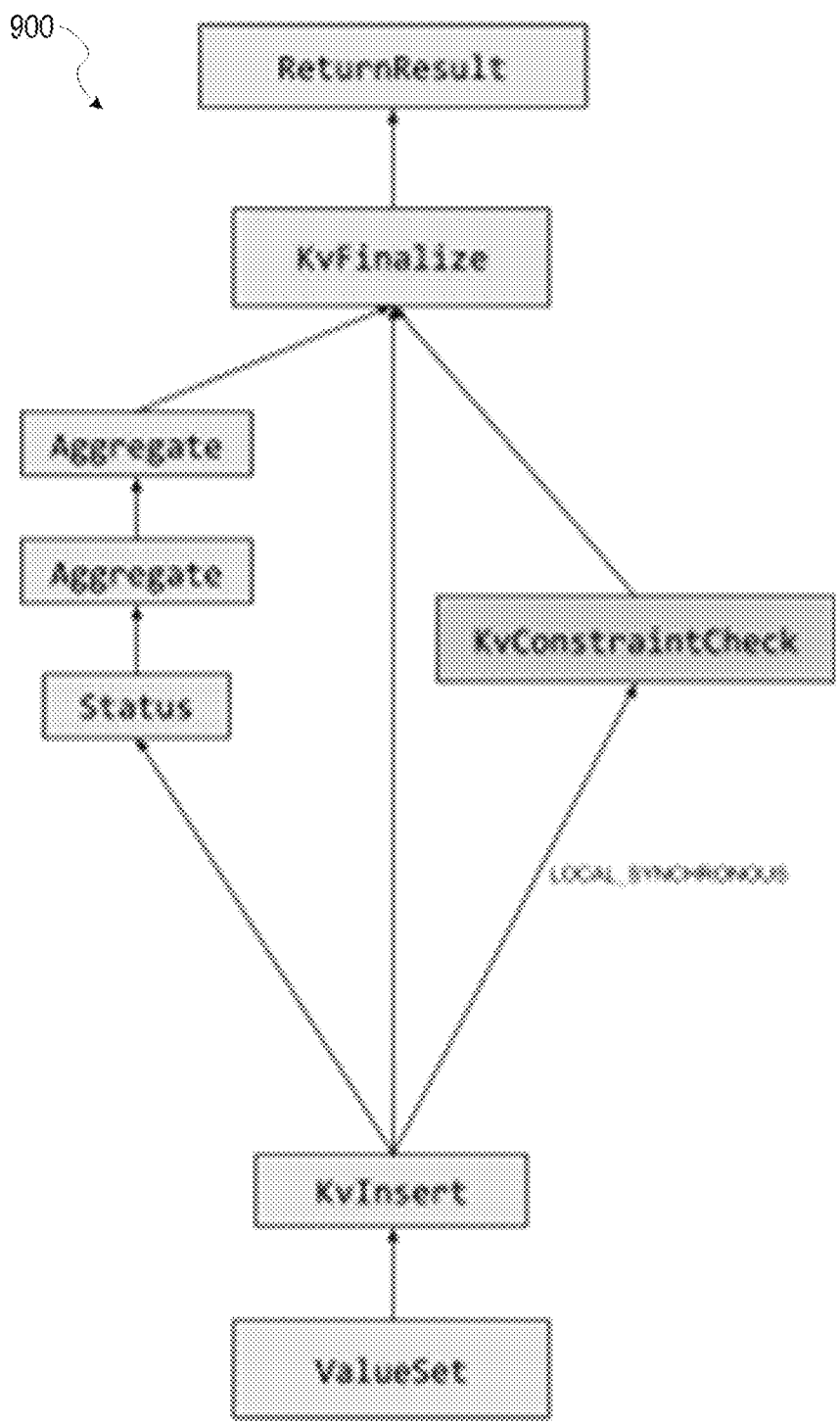
FIG. 9 illustrates an example of a query plan including a key value constraint check rowset operator (RSO) for an insert statement, in accordance with an embodiment of the subject technology.

FIG. 9 illustrates an example of a query plan including a key value constraint check rowset operator (RSO) for an insert statement, in accordance with an embodiment of the subject technology.

Example 1: Insert Statement with Primary Key and Unique Constraint

CREATE HYBRID TABLE tbl (id int PRIMARY KEY, email text UNIQUE);
INSERT INTO tbl VALUES (1, 'n@gmail.com'), (2, 'd@gmail.com'), (3, 'n@gmail.com');

The following changes are implemented in compute service manager 108 (e.g., global services).

Similar to the change described in FIG. 8, a KvConstraintCheck RSO is introduced in a query plan. Specifically for this case, since there is only insertion involved in this statement, a query plan can be optimized and the Constraint Check does not need to wait for other KvInsert RSOs to be finished since the constraint validation of one inserted row does not rely on the others.

1. A KvConstraintCheck RSO will connect the KvInsert with the link type LOCAL SYNCHRONOUS. The KvConstraintCheck could be scheduled immediately after the KvInsert is terminated in a worker and it does not need to wait for the execution of the KvInsert in other workers.
2. For the multi-writer case when the insertion is split across multiple writer instances and there is constraint violation, at least one instance will detect the violation and report it to KvConstraintCheck, thus we will not miss the constraint violation.

The following discussion relates to transaction manager 440 changes.

In an implementation, a bulkInsert API is modified to indicate which inserting keys violate a constraint and should continue processing even if a violation of the constraint is detected.

semi_future<vector<pair<WriteTimestamp, boolean>>>bulkInsert(KVPairs&&, . . . )

The following discussion relates to Kvinsert RSO as shown in query plan 900 of FIG. 9.

Changes for Kvinsert RSO processing:
1. RsoiKvInsert::gotRowset( ): It will do the bulkInsert as usual for both the base table and the unique index table. When there is a violating key, it will not throw the duplicate key exception. It will save the violating keys (in this case, the unique index key for email n@gmail.com) into the violating keys list.
2. RsoiKvInsert::terminate( ): it will send the violating keys and the index mapping to KvConstraintCheck.

```
// changes In Kvinsert
void RsoiKvInsert::gotRowset(Rowset& rowset) {
  . . .
  insertIntoBaseTable( );
  // this will call the new bulkInsert API and save the
    violating keys insertIntoUniqueIndexes( );
}
{
void RsoiKvInsert::terminate( ) {
  . . .
  sendViolatingKeys( );
}
```

The following discussion relates to KvConstraintCheck RSO as shown in FIG. 9.
1. RsoiKvConstraintCheck::processImpl( ): It will read the violating keys and call transaction manager 440 API checkConstraints( ) to perform the constraint checking for these keys.

```
// changes In KvConstraintCheck
void        RsoiKvConstraintCheck::processImpl
  (SerializeObject*object, . . . )
  . . . deserializeConflictKeys( ); bulkConstraintCheck( );
  . . .
}
```

Figure 10:
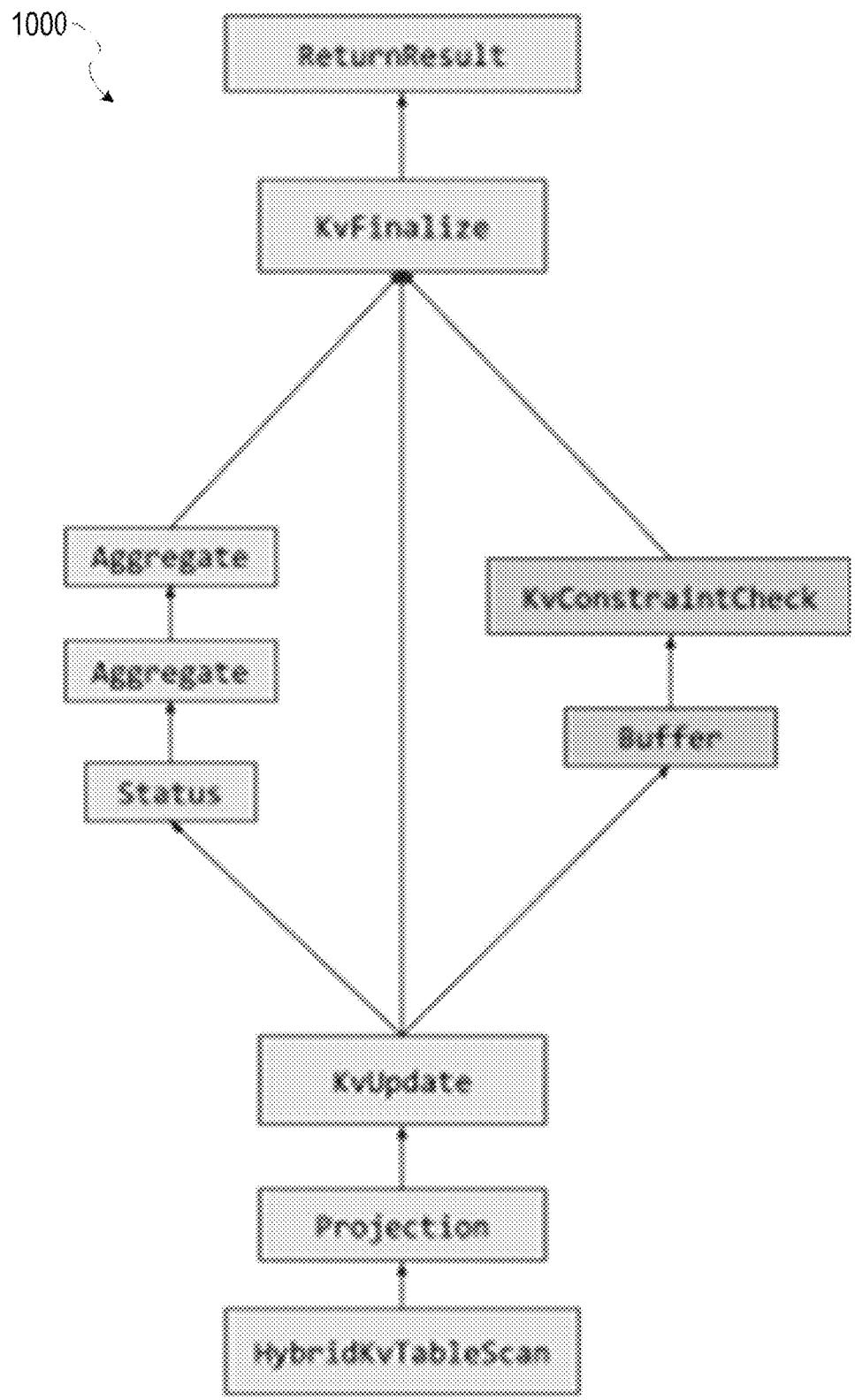
FIG. 10 illustrates an example of a query plan including a key value constraint check rowset operator (RSO) for an update statement, in accordance with an embodiment of the subject technology.

FIG. 10 illustrates an example of a query plan including a key value constraint check rowset operator (RSO) for an update statement, in accordance with an embodiment of the subject technology.

Example 2: Update Statement with Foreign Key Constraint

The following example updates a table with foreign key that references itself. Suppose there are already two rows (1, 1), (2, 2) before the update statement.

CREATE HYBRID TABLE tbl (id int PRIMARY KEY, xid int REFERENCES tbl (id));
UPDATE tbl SET id=id+1;

The following relates to the compute service manager 108 (e.g., global services).

For this update case, the query plan (e.g., query plan 1000) will be same as described in FIG. 8.

1. A Buffer RSO will be introduced to work as a pipeline breaker. It will be used to wait for all the KvUpdate RSOs are done with the data modification and then start the KvConstraintCheck RSO processing.

The following relates to KvUpdate RSO in the example of FIG. 10.

1. RsoiKvUpdate::gotRowset( ): It will first write the base table via the bulkDelete and bulkInsert APIs (removing the old keys and inserting the new keys). This will discover the duplicate primary keys during the insertion of the first row's new key (row (2, 1)). The index write and the foreign key constraint check are then performed, and it will discover that the removing the first row's old key will orphan the row referring to it (row (2,1) itself). The two violating key and type will be saved.
2. RsoiKvUpdate:terminate( ): it will send the violating keys to KvConstraintCheck.

The following relates to KvConstraintCheck RSO in the example of FIG. 10.

KvConstraintCheck::processImpl( ):
1. It will receive the violating keys and we will do the
2. constraint check again. The new primary key in record (2, 1) will be valid since the key of the old record (2, 2) is deleted.
3. However the foreign key will still be violated, as the row (2, 1) will not have a valid referencing key for value 1.
4. It will then throw the foreign key constraint violation exception The following relates to Transaction Deferred.

When the constraint is defined as the DEFERRED, the constraint validation is deferred till the end of the transaction. The following discussion clarifies the transaction semantics under deferred constraints If the constraint validation is deferred at the end of the transaction, there could be violating constraints, e.g., duplicate primary keys, during the statement execution of the transaction. The duplicate primary keys or unique index keys will break the previous assumption that there are no duplicate keys during the read. However, it will not impact other concurrent transactions since the isolation level is read committed and after the transaction commit, the constraint will be held validated.

The below example implies that changes are required in transaction manager 440.

```
CREATE HYBRID TABLE tbl (
  a int primary key deferrable initially deferred, -> defined as
    deferred at first
  b int unique
)
INSERT
INTO tbl
VALUES
(1,1);
BEGIN;
INSERT INTO tbl VALUES (1,2); -> this will succeed as the
pk validation is deferred SELECT * FROM tbl;    -> this
will return (1, 1), (1, 2)
```

```
INSERT INTO tbl VALUES (1,3), (1,3); -> this will succeed too
SELECT * FROM tbl;           -> this will return (1, 1),
(1, 2), (1, 3), (1, 3) DELETE FROM tbl WHERE b=3;
                             -> this will delete row
(1, 3), (1,3)
SELECT * FROM tbl;           -> this will return (1, 1), (1, 2)
COMMIT;                      -> this will fail since the pk is violated
SELECT * FROM tb1;           -> this will return (1, 1)
```

In order to support the transaction deferred constraint, the constraint validation can be deferred at the end of the transaction during commit and allow temporary constraint violations for the statements execution. Similar to the statement level deferred semantics, the KvDMLs RSO can be used to perform the constraint check, and if there is any violating constraint in the current statement, such violating constraint(s) are saved (e.g., stored) for future evaluation at the end of transaction instead of sending to KvConstraint-Check for evaluation. The statement violating rows need to be saved because different statement could be executed in different XP instances (e.g., execution nodes) under different query plan at different time.

When a user issues a transaction commit, triggering the constraint validation is performed, which needs to read the saved constraint violating rows and do the validation.

Figure 11:
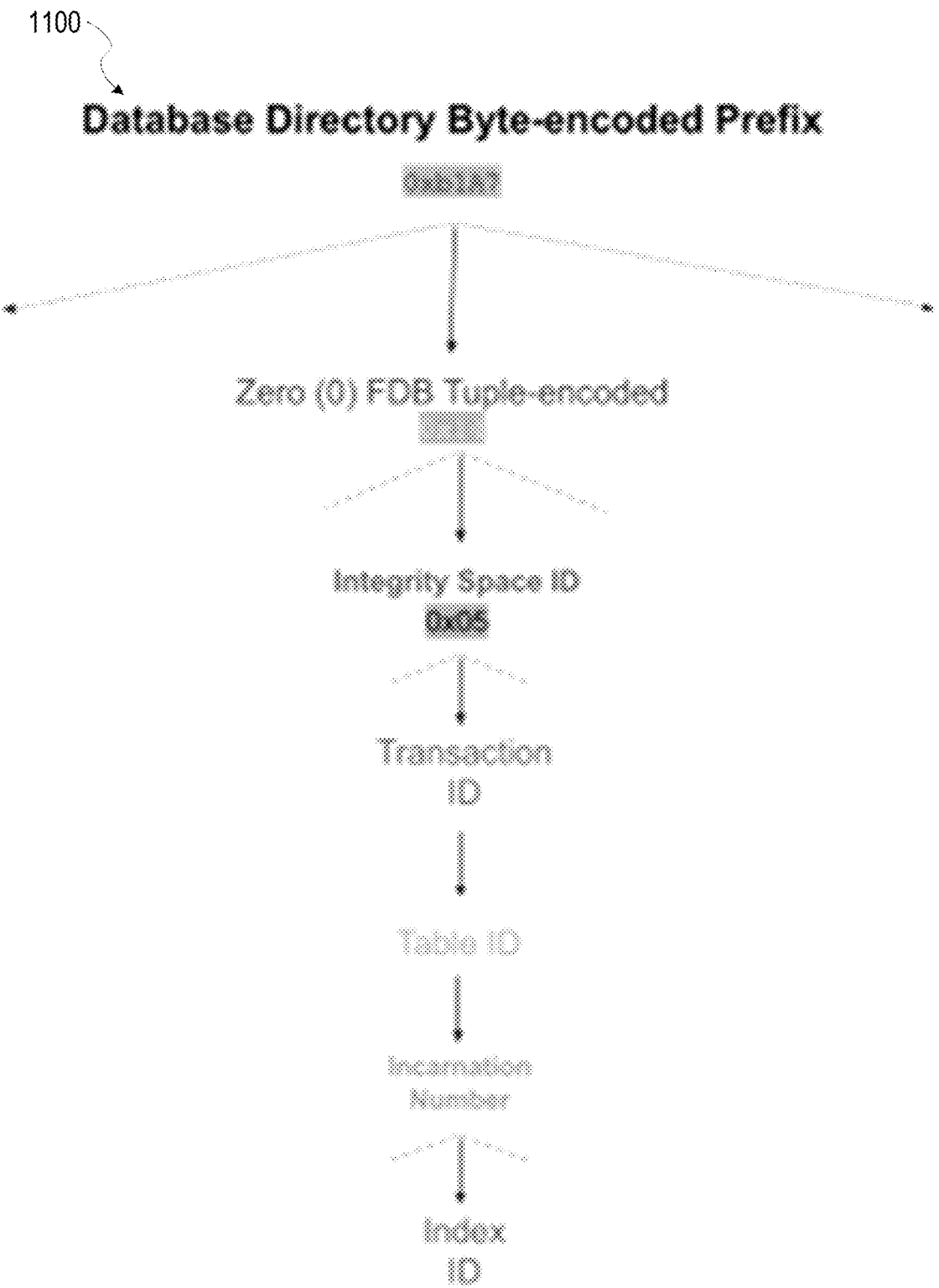
FIG. 11 illustrates an example of an integrity space layout, in accordance with an embodiment of the subject technology.

FIG. 11 illustrates an example of an integrity space layout, in accordance with an embodiment of the subject technology.

In the example of FIG. 11, an integrity space layout 1100 is shown.

In an embodiment, a separate space to save the temporarily violating keys of a statement is provided, so that at the end of the transaction, the violating keys are processed and validated.

In an implementation, a dedicated key space is provided to save the violating keys. The key space will be located under the database directory with a specific integrity space ID. Based on the transaction id, different table's violating keys are saved under the same transaction id. By doing this, all the violating keys that are associated with a transaction are saved together, the process of the violating keys will be faster and cleaning the keys of a transaction in this integrity space is performed.

When compute service manager 108 generates the SDL (storage definition language) for the index and constraint metadata, a flag is included in the table metadata to specify whether the constraint of the index is deferred or not. The deferred flag is only true if the constraint is defined as deferred. For example, suppose an unique index is defined as deferred, the desired SDL will be populated like below.

```
"catalog": {
  "objects": [
    {
      "id": 17256673602, "name": "USER",
      ...
      "columns": [
      ...
      ],
      "kvUniqueIndices":[
        {
          "id":1,
          "indexColumns":[2,3],
          "deferred": true
        }
      ]
    }
  ]
}
```

The following discussion relates to RSO processing.

On the RSO processing side, two major parts are contemplated: one is to support the transaction deferred constraint on the DML statements and the other one is to support the select statements that could possibly read the duplicate keys.

First let's discuss about how to support the transaction deferred constraint for the DML statements. An example is provided below when an insert statement causes a duplicate key error.

Example 3: Insert Statement Causing Duplicate Keys

```
CREATE HYBRID TABLE tbl (
   a int PRIMARY KEY DEFERRABLE INITIALLY DEFERRED,
   b int
);
INSERT INTO tbl VALUES
(1,1) ; BEGIN;
INSERT INTO tbl VALUES (1,3); -- generate duplicate keys
COMMIT;
```

The following relates to Kvinsert RSO.

For the second insert statement which happened in the statement of a transaction, Kvinsert RSO tries to insert a duplicate key on a primary key that is deferred. The insert RSO now should realize that the primary key is deferred and should not fail the statement. When it finds the violating keys, it will save them into the integrity space instead of throwing the error.

For the second insert statement which generates a duplicate key [1], the transaction id is added, table id and the failing index id are included as the prefix and the user key is appended, and the entry is saved into the integrity space. In this manner, it can be determined which index this violating key belongs to and it is possible to use the key directly for constraint checking without packing again. An example for above entry saved in the integrity space would be like below:

Database Prefix|0x14|Integrity Space ID|Transaction ID|Table ID|Inca Num|Index ID|[1]

In an implementation, please note that the same key can be duplicated multiple times in the same or different statements, and writing the same key multiple times is permitted, however only one entry is generated since one constraint checking per key is performed.

Next it will be discussed how to handle the delete/update statement support and the select statements which may read duplicate keys. Before this, the transaction manager 440 changes are described first.

In order to handle the write and read operation with duplicate keys within a transaction, a few places in transaction manager 440 are extended. In an implementation, the transaction deferred constraint will only work for multi-statement transactions and thus it will not apply to transaction manager 440 fast-path as it is only for auto commit transactions.

The following discussion relates to transaction manager 440 key and value format.

The below shows the transaction manager 440's RowID/Stamp format for keys that are without the commit timestamp embedded.

Statement Number and Restart Count can be used to differentiate the rows with the same key written in different statements.

Fields Worker ID and the Write Number can be used to differentiate the rows with the same key written in a single statement. Thus, writing the duplicate keys in the same statement is permitted and they will not overwrite each other.

There is a Zero field with 5 bits is reserved for future use and currently it is always zeros.

The Tombstone flag is a 1 bit field and used to represent whether a key-value pair is a tombstone record. In the tombstone record, the value part is empty.

```
+-+-+-+-+-+-+-+-+-+-+-+-+-+-+-+-+-+-+-+-+-+-+-+-+-+-+-+-+-+-+-+
|    CODE     |      IsEmbedded      |                        |
+-+-+-+-+-+-+-+-+-+-+-+-+-+-+-+-+-+-+-+                       +
|                      Transaction ID                         |
+                      +-+-+-+-+-+-+-+-+-+-+-+-+-+-+-+-+-+-+-+
|                      |    SNL      |   Statement:           |
+-+-+-+-+-+-+-+-+-+-+-+-+-+-+-+-+-+-+-+-+-+-+-+-+-+-+-+-+-+-+-+
: Number      |    RCL      |     Restart Count         :
+-+-+-+-+-+-+-+-+-+-+-+-+-+-+-+-+-+-+-+-+-+-+-+-+-+-+-+-+-+-+-+
:         |  Zero |L|T|S|   WIDL    |   Worker ID ... |
+-+-+-+-+-+-+-+-+-+-+-+-+-+-+-+-+-+-+-+-+-+-+-+-+-+-+-+-+-+-+-+
|   WNL   |Write Number...|   PNL   |Part Number ... F|
+-+-+-+-+-+-+-+-+-+-+-+-+-+-+-+-+-+-+-+-+-+-+-+-+-+-+-+-+-+-+-+
|                                                             |
+                                                             +
|                      Write Timestamp                        |
+                      +-+-+-+-+-+-+-+-+-+-+-+-+-+-+-+-+-+-+-+
|                      |Size         |     Version            |
+-+-+-+-+-+-+-+-+-+-+-+-+-+-+-+-+-+-+-+-+-+-+-+-+-+-+-+-+-+-+-+
```

The following changes are implemented:
1. Use one bit in the Zero field to specify whether the record is written by the transaction with deferred constraint and the key in the record belongs to a deferred constraint.
2. When a tombstone pair is generated for the deletion of a record belonging to the deferred constraint, its RowID/Stamp is saved into the value part of the pair. The Stamp can be used to identify which exactly key-value pair is deleted as it is unique across key value pairs even the user key is the same.

The following discussion relates to transaction manager 440 functions.
1. In the transaction manager 440 bulkRemove( ) function, if the delete operation involves a constraint that is deferred, the Stamp is included in the tombstone key-value pair. The value will be used to differentiate the deleted key with the other records with the same key.
2. In transaction manager 440 read( ) and readRange( ) functions, when deciding the visibility of a key checking the tombstone record, the value of the key-value pair for the deleted record is considered; also the readRange( ) should be able to return multiple pairs with the same key if there are duplicate keys visible in current statement.

```
// transaction manager 440 changes
semi_future<vector<WriteTimestamp>>bulkRemove
    (KVPairs& pairs ... ) {
...
Stamp stamp; stamp.tombstone(true);
bulkWrite(pairs, stamp, WriteType::DELETE, ... );
...
}
semi_future<optional<Value>>read(Key& key ... ) {
...
// when populate the visible pairs, check the tombstone
    flag and the deferred flag
// if the deferred flag is set, find the pair with the same
    Stamp
// Avoid adding the found pair into the visible pairs for the
    cursor
...
}
```

Now let's take a look at an example about how to support the delete statement which only delete one row after the duplicate write statement.

Example 4: Delete Statement Deletes a Specific Key

The following example relates to deleting a row in a transaction which has the duplicate keys written by the previous statement.

```
CREATE HYBRID TABLE tbl (
    a int PRIMARY KEY DEFERRABLE INITIALLY DEFERRED,
    b int
);
INSERT INTO tbl VALUES
(1,1); BEGIN;
INSERT INTO tbl VALUES
(1,3); DELETE FROM tbl WHERE
b = 1; SELECT * FROM tbl;
COMMIT ;
```

The following relates to KvDelete RSO.

Currently a deleted row is represented by a new key-value pair with a tombstone flag in the key, but it will not work for the above case to specify which row is deleted for (1,1) and (1,3). As mentioned above in the transaction manager 440 discussion, the RowID/Stamp can be saved as the value in the tombstone record, so that the deleted row could be differentiated with the other rows with the same key. For the above examples, when the first row (1, 1) is inserted, a key-value pair is added in transaction manager 440:
 (Prefix|1|stamp1, 1)

After the second insert, there will be two key-value pairs. These two pairs contains the same user key, but their keys are different since the RowID/Stamp is different.
 (Prefix|1|stamp1, 1)
 (Prefix|1|stamp2, 3)

When the delete statement happened, a tombstone record is generated with the stamp of the deleted pair saved as the value (in this case, stamp1). When processing the deleted tombstone record, its saved stamp can be used to locate the record that was deleted (in this case, the first row), so that the read could select the correct result.
 (Prefix|1|stamp1, 1)
 (Prefix|1|stamp2, 3)
 (prefix|1|stamp3(with Tombstone=1), stamp1)

The following discussion relates to KvTableScanner.

For the selection statement, when the KvTableScanner try to read the data, the new version of the readRange( ) call to transaction manager 440 is used by passing the deferrable flag, specifying that this select statement is querying the data with deferred constraint and could see the duplicate keys. The transaction manager 440 will rely on this flag to consider the key-value pairs with the deferred flag and adopt the new visibility logic.

Example 5: Update Statement that Value of the Non-Key Columns

```
CREATE HYBRID TABLE tbl (
    a int PRIMARY KEY DEFERRABLE INITIALLY DEFERRED,
    b int
);
INSERT INTO tbl VALUES
(1,1); BEGIN;
UPDATE tbl SET b = 2 where
a = 1; COMMIT;
```

The above example tries to update column b's value. Originally when an update that only change the value of non-key columns, a key value pair update operation is issued instead of deleting the old record and inserting the new one, since transaction manager 440 assumes that only one record exists for the same key and rely on the version to decide which is the correct value. However, this assumption will not hold any more in deferred constraint cases. For example, in a deferred transaction, inserting a row (1, 2) generates the same record with the update statement thus differentiating between them could not be done. The below statement could generate the same records with the above.

```
CREATE HYBRID TABLE tbl (
    a int PRIMARY KEY DEFERRABLE INITIALLY DEFERRED,
    b int
);
INSERT INTO tbl VALUES
(1,1); BEGIN;
INSERT INTO tbl VALUES
(1,2); COMMIT;
```

In order to differentiate the two cases, the following is performed: delete the old record and insert a new record even the non-key column value of a row is updated. In this way the update statement will generate one tombstone record and one new record thus the result for the later select would be correct. In above examples, the update statement will generate pairs (1|deferred|tombstone, 1), (1|deferred, 2) while the insert statement will only add pair (1|deferred, 2), thus the correct rows could be returned for the read statement.

Example 6: Statements Violates FK Constraints

In an implementation, the FK is defined as deferred. Overall supporting the deferred FK would be similar to deferred PK or unique index, but it will not involve any transaction manager 440 key/value format change as it will not generate any duplicate keys in transaction manager 440 within the transaction. The following are example statements.

```
CREATE HYBRID TABLE
    t1 ( a int
    PRIMARY KEY) ;
CREATE HYBRID TABLE t2 (
    a int PRIMARY KEY,
    b int REFERENCES t1 (a) DEFERRABLE INITIALLY
      DEFERRED);
BEGIN ;
INSERT INTO t2 VALUES (1, 10);
```

```
INSERT INTO t1 VALUES (10);
COMMIT;
```

The following relates to Kvinsert RSO.

In the example above, the first insert statement will insert a row in the child table, which will trigger the foreign key constraint check on parent table. Similar to the bulkInsert, the checkConflictRange call which does the foreign key check and conflict registration should return whether the foreign key is violated or not. (in this case, the FK referencing t1.a will be violated as 10 does not exist in t1). Kvinsert will save the violating key in the Integrity Space for further validation.

Later the second insertion statement will insert the parent record and the commit will trigger the validation from the Integrity Space and at this time, the FK check is valid and the commit will succeed.

The following relates to Transaction Commit.

Similar to the current Transaction manager 440 commit( ) API, in an implementation, an API is provided which will do the integrity validation. In an example, when transaction manager 440 OperationJob calls the Transaction manager 440 commit( ), it will also call the new integrity Validate( ) before calling commit( ). If there is a violating key, the commit statement will fail. Otherwise the commit will succeed and the transaction will be committed. In an example, integrity Validate( ) will also mark the transaction state in TST as pending validate, so that if there is any concurrent ongoing DMLs started after calling integrityValidate(( ), they will fail so that the validation for the writes of the concurrent DMLs will not be missed.

In an implementation, a function cleanIntegritySpace( ) will clean out the integrity space for the committed or rolled back transactions. The cleanIntegritySpace( ) will be triggered by a BG (e.g., background process) which is similar to the TST compaction or Idle Transaction aborter and the BG will clean the integrity space associated with the finished transaction.

In case if there is any unexpected failure during the call of integrityValidate( ), although this should be with low chance, the transaction will fail and the transaction will be rolled back and the BG cleans out the integrity space. If the user does not explicitly commit or rollback the transaction, the transaction will be rolled back implicitly. The BG will also clean its associated violating keys in the integrity space so the purge of the obsolete violating keys in the integrity space is not missed.

```
// changes
void integrityValidate(TxnId txnId) {
    . . .
    Change the transaction state to pending_validate in TST
    Read all the violating keys in Integrity Space
    for transaction txnId Call
    bulkConstraintsCheck( ) and do the constraint
    check again.
}
void cleanItegritySpace (TxnId txnId) {
    Clean the integrity space under the transaction txnId.
}
```

The following relates to deferrable constraint creation.

For CREATE TABLE Statement, the first step is to enable the table creation for the constraint deferability definition, which is disabled on hybrid tables. This will allow us define the hybrid table with constraint that is deferrable and initially deferred/immediate.

In ConstraintDPO, there is the deferrable, immediate attribute which was used to support the syntax in regular table (e.g., non-hybrid). When the hybrid table is created with the deferability attribute, they will be saved in ConstraintDPO associated with the current constraint definition.

In an example where the implementation of the transaction deferred is not supported, a parameter will be introduced which is false by default to cover the changes. In another implementation, subsequently the parameter will be changed to allow the users to definite the deferrable constraints.

The following relates to SET CONSTRAINT support (e.g., shown in example statements).

```
CREATE HYBRID TABLE tbl (a int primary key, b int,
CONSTRAINT c1 UNIQUE
(b) DEFERRABLE INITIALLY IMMEDIATE) ;
BEGIN;
SET CONSTRAINT c1 DEFERRED;
...
```

The following relates to TransactionDPO.

In the hybrid table slice in TransactionDPO, a new attribute is added which saves a list of the deferred constraints or the flag which represents all constraints are deferrable will be deferred in this transaction.

The following relates to compute service manager 108.

When compiling the statement, the deferrable state from TransactionDPO is determined, and the index attribute on deferability is updated. For example, if a constraint is defined as deferrable initially immediate, and within the transaction which makes all constraint deferred, setting this index as deferred updates the attribute in the catalog/table/index section in SDL.

Since the subject system supports parallel statements execution, the SET CONSTRAINT statement could run concurrently with other statements. The normal statements will rely on the attribute in TransactionDPO to decide whether to overwrite the deferability of the constraint. By doing so, the statement could either see the SET CONSTRAINT effect (meaning it happens later than the SET statement) or could not see the effect (meaning it runs earlier than the SET statement).

In practice, users mostly want to change a deferrable but initially immediate constraint to deferred, but not the reverse direction. In an implementation, supporting the SET CONSTRAINT to deferred is provided. Subsequently, support for changing the constraint from deferred to immediate is provided where it will update the TransactionDPO attribute and issue an implicit integrity validation before the commit.

Figure 12:
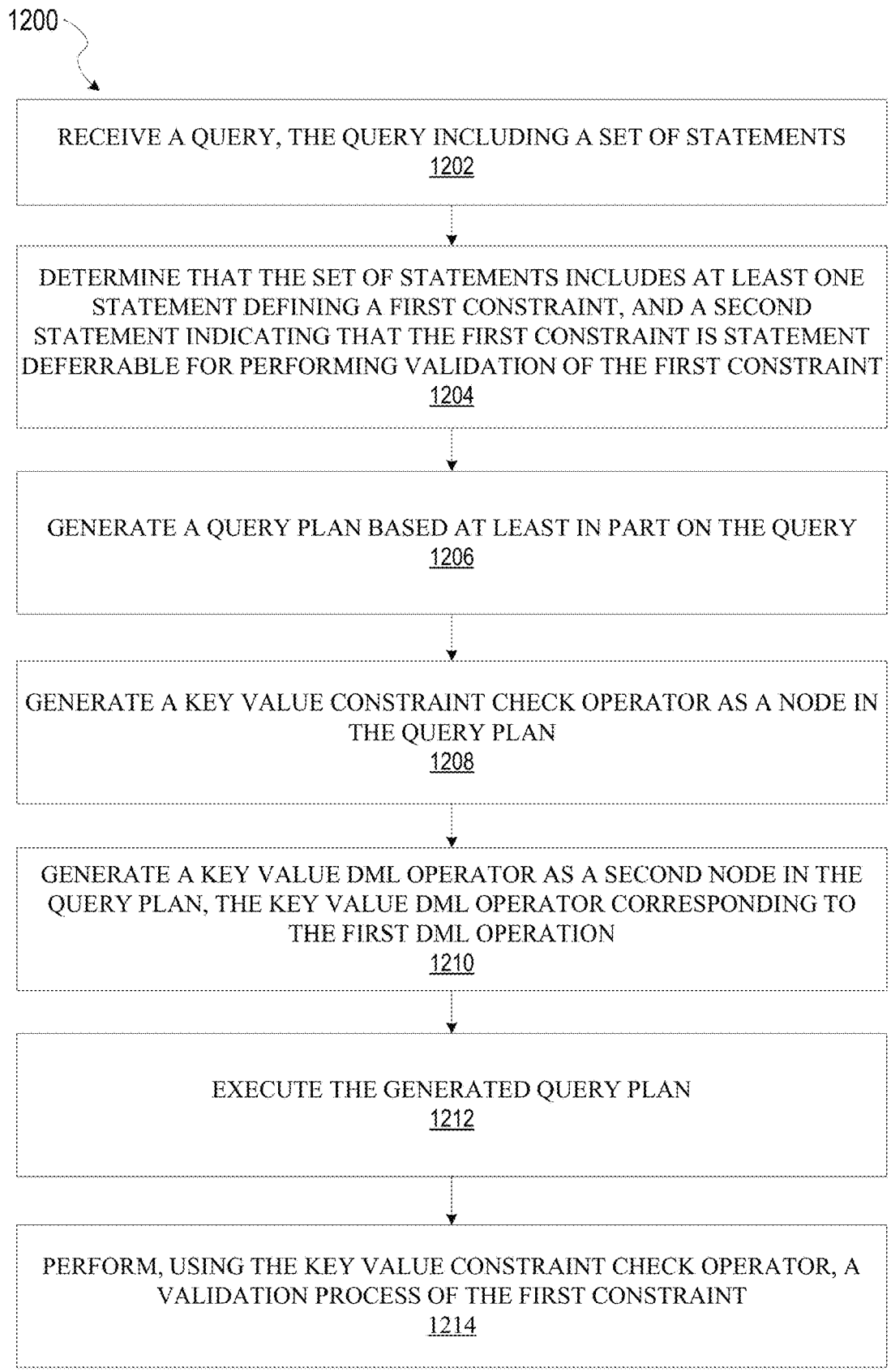
FIG. 12 is a flow diagram illustrating operations of a database system in performing a method in accordance with embodiments of the subject technology.

FIG. 12 is a flow diagram illustrating operations of a database system in performing a method 1200 in accordance with embodiments of the subject technology. The method 1200 may be embodied in computer-readable instructions for execution by one or more hardware components (e.g., one or more processors) such that the operations of the method 1200 may be performed by components of network-based database system 102, such as components of the compute service manager 108 or a node in the execution platform 110. Accordingly, the method 1200 is described below, by way of example with reference thereto. However, it shall be appreciated that the method 1200 may be deployed on various other hardware configurations and is not intended to be limited to deployment within the network-based database system 102.

At operation 1202, compute service manager 108 receives a query, the query including a set of statements, the set of statements including a first statement comprising a first data manipulation language (DML) operation on a first table;

At operation 1204, compute service manager 108 determines that the set of statements includes at least one statement defining a first constraint, and a second statement indicating that the first constraint is statement deferrable for performing validation of the first constraint;

At operation 1206, compute service manager 108 generates a query plan based at least in part on the query.

At operation 1208, compute service manager 108 generates a key value constraint check operator as a node in the query plan.

At operation 1210, compute service manager 108 generates a key value DML operator as a second node in the query plan, the key value DML operator corresponding to the first DML operation.

At operation 1212, compute service manager 108 executes the generated query plan.

At operation 1214, compute service manager 108 performs, using the key value constraint check operator, a validation process of the first constraint based at least in part on a set of violating keys of each DML operation from the set of statements.

In an embodiment, compute service manager 108 further determines that at least one key that violated the first constraint still violates the first constraint after each DML operation from the set of statements has completed execution.

In an embodiment, compute service manager 108 further, in response to the determining, terminates execution of the query.

In an embodiment, compute service manager 108 further determines that each key from the set of violating keys no longer violates the first constraint after each DML, operation from the set of statements has completed execution.

In an embodiment, compute service manager 108 further in response to the determining, finalizes execution of the query; and returns a set of results from finalizing execution of the query.

In an embodiment, generating the query plan based at least in part on the query further comprises: generating a buffer operator as a particular node in the query plan, the particular node being a child node of the node corresponding to the key value constraint check operator, the buffer operation ensuring that the key value constraint check operator is performed after each DML operation from the set of statements has already been performed.

In an embodiment, the set of violating keys comprises at least one key that violated the first constraint.

In an embodiment, the second statement indicating that the first constraint is statement deferrable comprises a set constraint statement.

In an embodiment, the set constraint statement is executed at a beginning of a transaction to define the first constraint.

In an embodiment, each DML operation from the set of statements comprises an insert operation, update operation, delete operation, or merge operation.

Figure 13:
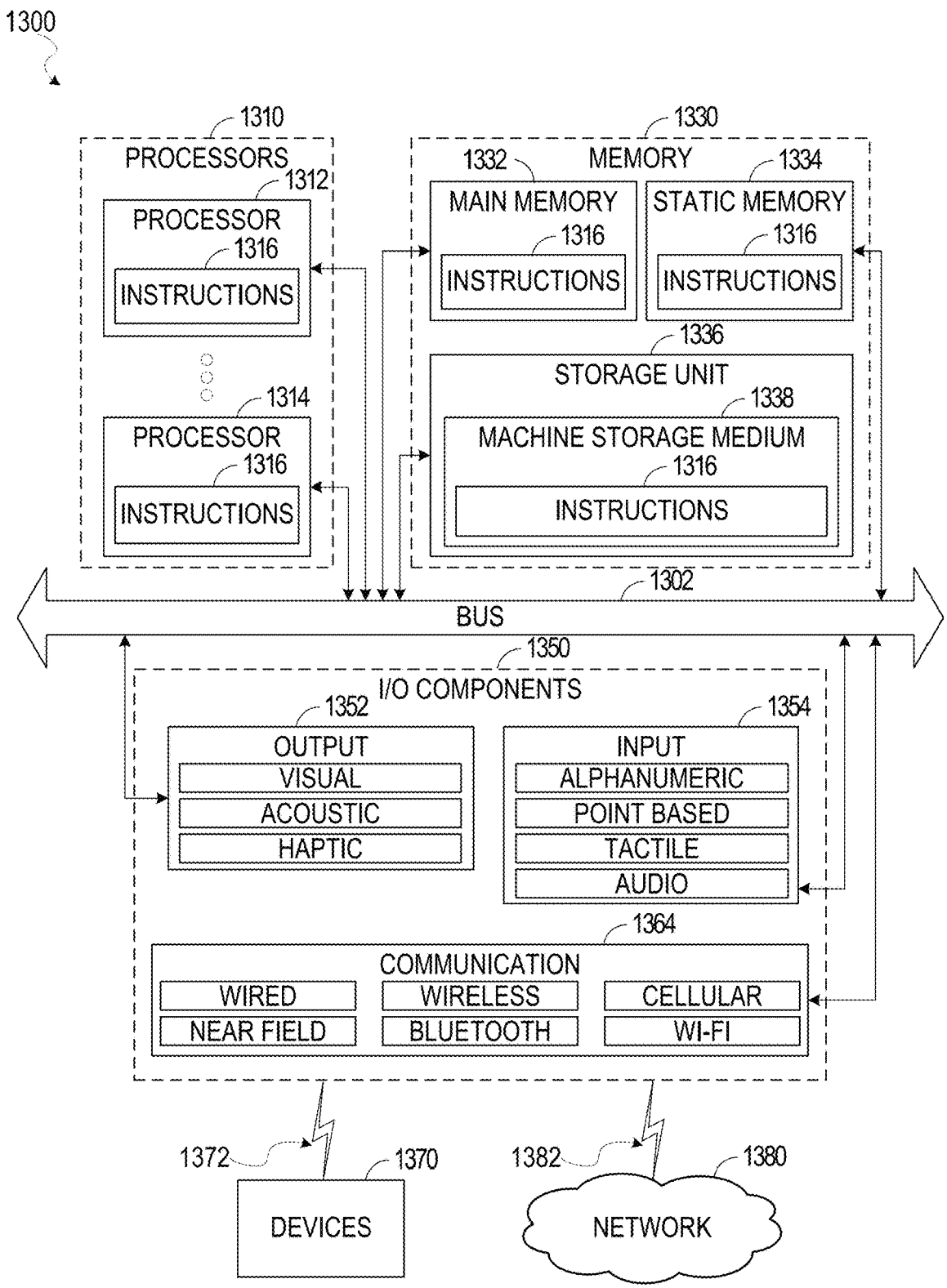
FIG. 13 illustrates a diagrammatic representation of a machine in the form of a computer system within which a set of instructions may be executed for causing the machine to perform any one or more of the methodologies discussed herein, in accordance with some embodiments of the present disclosure.

FIG. 13 illustrates a diagrammatic representation of a machine 1300 in the form of a computer system within which a set of instructions may be executed for causing the machine 1300 to perform any one or more of the methodologies discussed herein, according to an example embodiment. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example, the instructions 1316 may cause the machine 1300 to execute any one or more operations of method(s) described before. As another example, the instructions 1316 may cause the machine 1300 to implement portions of the data flows described herein. In this way, the instructions 1316 transform a general, non-programmed machine into a particular machine 1300 (e.g., the compute service manager 108 or a node in the execution platform 110) that is specially configured to carry out any one of the described and illustrated functions in the manner described herein.

In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 includes processors 1310, memory 1330, and input/output (I/O) components 1350 configured to communicate with each other such as via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1312 and a processor 1314 that may execute the instructions 1316. The term "processor" is intended to include multi-core processors 1310 that may comprise two or more independent processors (sometimes referred to as "cores") that may execute instructions 1316 contemporaneously. Although FIG. 13 shows multiple processors 1310, the machine 1300 may include a single processor with a single core, a single processor with multiple cores (e.g., a multi-core processor), multiple processors with a single core, multiple processors with multiple cores, or any combination thereof.

The memory 1330 may include a main memory 1332, a static memory 1334, and a storage unit 1336, all accessible to the processors 1310 such as via the bus 1302. The main memory 1332, the static memory 1334, and the storage unit 1336 store the instructions 1316 embodying any one or more of the methodologies or functions described herein. The instructions 1316 may also reside, completely or partially, within the main memory 1332, within the static memory 1334, within machine storage medium 1338 of the storage unit 1336, within at least one of the processors 1310 (e.g., within the processor's cache memory), or any suitable combination thereof, during execution thereof by the machine 1300.

The I/O components 1350 include components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or another suitable device to interface with the network 1380. In further examples, the communication components 1364 may include wired communication components, wireless communication components, cellular communication components, and other communication components to provide communication via other modalities. The devices 1370 may be another machine or any of a wide variety of peripheral devices (e.g., a peripheral device coupled via a universal serial bus (USB)). For example, as noted above, the machine 1300 may correspond to any one of the compute service manager 108 or the execution platform 110, and the devices 1370 may include the client device 114 or any other computing device described herein as being in communication with the network-based database system 102 or the cloud storage platform 104.

Executable Instructions and Machine Storage Medium

The various memories (e.g., 1330, 1332, 1334, and/or memory of the processor(s) 1310 and/or the storage unit 1336) may store one or more sets of instructions 1316 and data structures (e.g., software) embodying or utilized by any one or more of the methodologies or functions described herein. These instructions 1316, when executed by the processor(s) 1310, cause various operations to implement the disclosed embodiments.

As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1380 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to the devices 1370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1316 for execution by the machine 1300, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

CONCLUSION

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   a memory storing instructions that cause the at least one hardware processor to perform operations comprising:
   receiving a query, the query including a set of statements, the set of statements including a first statement comprising a first data manipulation language (DML) operation on a first table;
   determining that the set of statements includes at least one statement defining a first constraint, and a second statement indicating that the first constraint is statement deferrable for performing validation of the first constraint;
   generating a query plan based at least in part on the query, the generating comprising:
   generating a key value constraint check operator as a node in the query plan;
   generating a key value DML operator as a second node in the query plan, the key value DML operator corresponding to the first DML operation;
   generating a buffer operator as a particular node in the query plan, the particular node being a child node of the node corresponding to the key value constraint check operator, the buffer operation ensuring that the key value constraint check operator is performed after each DML operation from the set of statements has already been performed; and
   executing the generated query plan, the executing comprising:
   performing, using the key value constraint check operator, a validation process of the first constraint based at least in part on a set of violating keys of each DML operation from the set of statements.

2. The system of claim 1, wherein the operations further comprise:
   determining that at least one key that violated the first constraint still violates the first constraint after each DML operation from the set of statements has completed execution.

3. The system of claim 2, wherein the operations further comprise:
   in response to the determining, terminating execution of the query.

4. The system of claim 1, wherein the operations further comprise:
   determining that each key from the set of violating keys no longer violates the first constraint after each DML operation from the set of statements has completed execution.

5. The system of claim 4, wherein the operations further comprise:
   in response to the determining, finalizing execution of the query; and
   returning a set of results from finalizing execution of the query.

6. The system of claim 1, wherein the set of violating keys comprises at least one key that violated the first constraint.

7. The system of claim 1, wherein the second statement indicating that the first constraint is statement deferrable comprises a set constraint statement.

8. The system of claim 7, wherein the set constraint statement is executed at a beginning of a transaction to define the first constraint.

9. The system of claim 1, wherein each DML operation from the set of statements comprises an insert operation, update operation, delete operation, or merge operation.

10. A method comprising:
    receiving a query, the query including a set of statements, the set of statements including a first statement comprising a first data manipulation language (DML) operation on a first table;
    determining that the set of statements includes at least one statement defining a first constraint, and a second statement indicating that the first constraint is statement deferrable for performing validation of the first constraint;
    generating a query plan based at least in part on the query, the generating comprising:
    generating a key value constraint check operator as a node in the query plan;
    generating a key value DML operator as a second node in the query plan, the key value DML operator corresponding to the first DML operation;
    generating a buffer operator as a particular node in the query plan, the particular node being a child node of the node corresponding to the key value constraint check operator, the buffer operation ensuring that the key value constraint check operator is performed after each DML operation from the set of statements has already been performed; and
    executing the generated query plan, the executing comprising:
    performing, using the key value constraint check operator, a validation process of the first constraint based at least in part on a set of violating keys of each DML operation from the set of statements.

11. The method of claim 10, further comprising:
    determining that at least one key that violated the first constraint still violates the first constraint after each DML operation from the set of statements has completed execution.

12. The method of claim 11, further comprising:
    in response to the determining, terminating execution of the query.

13. The method of claim 10, further comprising:
    determining that each key from the set of violating keys no longer violates the first constraint after each DML operation from the set of statements has completed execution.

14. The method of claim 13, further comprising:
    in response to the determining, finalizing execution of the query; and
    returning a set of results from finalizing execution of the query.

15. The method of claim 10, wherein the set of violating keys comprises at least one key that violated the first constraint.

16. The method of claim 10, wherein the second statement indicating that the first constraint is statement deferrable comprises a set constraint statement.

17. The method of claim 16, wherein the set constraint statement is executed at a beginning of a transaction to define the first constraint.

18. The method of claim 10, wherein each DML operation from the set of statements comprises an insert operation, update operation, delete operation, or merge operation.

19. A non-transitory computer-storage medium comprising instructions that, when executed by one or more processors of a machine, configure the machine to perform operations comprising:
   receiving a query, the query including a set of statements, the set of statements including a first statement comprising a first data manipulation language (DML) operation on a first table;
   determining that the set of statements includes at least one statement defining a first constraint, and a second statement indicating that the first constraint is statement deferrable for performing validation of the first constraint;
   generating a query plan based at least in part on the query, the generating comprising:
   generating a key value constraint check operator as a node in the query plan;
   generating a key value DML operator as a second node in the query plan, the key value DML operator corresponding to the first DML operation;
   generating a buffer operator as a particular node in the query plan, the particular node being a child node of the node corresponding to the key value constraint check operator, the buffer operation ensuring that the key value constraint check operator is performed after each DML operation from the set of statements has already been performed; and
   executing the generated query plan, the executing comprising:
   performing, using the key value constraint check operator, a validation process of the first constraint based at least in part on a set of violating keys of each DML operation from the set of statements.

20. The non-transitory computer-storage medium of claim 19, wherein the operations further comprise:
   determining that at least one key that violated the first constraint still violates the first constraint after each DML operation from the set of statements has completed execution.

21. The non-transitory computer-storage medium of claim 20, wherein the operations further comprise:
   in response to the determining, terminating execution of the query.

22. The non-transitory computer-storage medium of claim 19, wherein the operations further comprise:
   determining that each key from the set of violating keys no longer violates the first constraint after each DML operation from the set of statements has completed execution.

23. The non-transitory computer-storage medium of claim 22, wherein the operations further comprise:
   in response to the determining, finalizing execution of the query; and
   returning a set of results from finalizing execution of the query.

24. The non-transitory computer-storage medium of claim 19, wherein the set of violating keys comprises at least one key that violated the first constraint.

25. The non-transitory computer-storage medium of claim 19, wherein the second statement indicating that the first constraint is statement deferrable comprises a set constraint statement.

26. The non-transitory computer-storage medium of claim 25, wherein the set constraint statement is executed at a beginning of a transaction to define the first constraint.

27. The non-transitory computer-storage medium of claim 19, wherein each DML operation from the set of statements comprises an insert operation, update operation, delete operation, or merge operation.

* * * * *